(12) United States Patent
Matsui et al.

(10) Patent No.: US 7,163,330 B2
(45) Date of Patent: Jan. 16, 2007

(54) FRONT LIGHT, REFLECTIVE TYPE OF DISPLAY, AND LIGHT CONTROLLING METHOD

(75) Inventors: Yuki Matsui, Nara (JP); Makoto Ohhira, Nara (JP); Motohiko Matsushita, Nara (JP); Akihiro Funamoto, Nara (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 78 days.

(21) Appl. No.: 10/843,213

(22) Filed: May 11, 2004

(65) Prior Publication Data

US 2005/0002175 A1 Jan. 6, 2005

(30) Foreign Application Priority Data

May 15, 2003 (JP) ............................. 2003-138023
Oct. 6, 2003 (JP) ............................. 2003-347514

(51) Int. Cl.
*F21V 8/00* (2006.01)
(52) U.S. Cl. ...................................... 362/603; 362/561
(58) Field of Classification Search ................. 362/561, 362/603; 349/63, 65
See application file for complete search history.

(56) References Cited

U.S. PATENT DOCUMENTS

| | | | |
|---|---|---|---|
| 6,652,109 B1 * | 11/2003 | Nakamura | ................... 362/600 |
| 6,738,116 B1 * | 5/2004 | Sasagawa et al. | .......... 349/113 |
| 6,799,860 B1 * | 10/2004 | Nakaoka et al. | ............ 362/615 |
| 6,825,896 B1 * | 11/2004 | Goto et al. | ................... 349/65 |
| 7,030,945 B1 * | 4/2006 | Umemoto et al. | ............ 349/65 |
| 2003/0137824 A1 * | 7/2003 | Shinohara et al. | ............ 362/31 |
| 2004/0022050 A1 * | 2/2004 | Yamashita et al. | ............ 362/31 |

* cited by examiner

*Primary Examiner*—Renee Luebke
*Assistant Examiner*—Robert May
(74) *Attorney, Agent, or Firm*—Osha Liang L.L.P.

(57) ABSTRACT

According to a front light comprising an optical waveguide 25 and a light source 24 arranged on the side of the optical waveguide 25, the optical waveguide 25 comprises a light input surface and light emission surface 28, and a plurality of deflection patterns 26 are formed on the surface opposed to the light emission surface 28. Light from the light source 24 is input from the light input surface of the optical waveguide 25 and propagated in the optical waveguide 25. The light totally reflected by the deflection patterns 26 among the light propagated in the optical waveguide 25 is emitted from the light emission surface 28 in the direction oblique to the normal direction of the light emission surface 28. The light is emitted from the light emission surface 28 so as to be aligned in one direction regardless of its position.

17 Claims, 30 Drawing Sheets

PRIOR ART

PRIOR ART

PRIOR ART

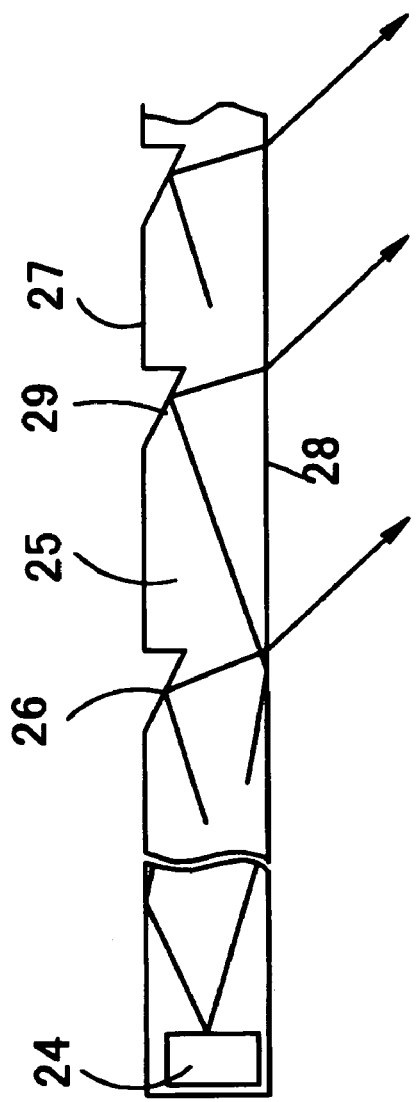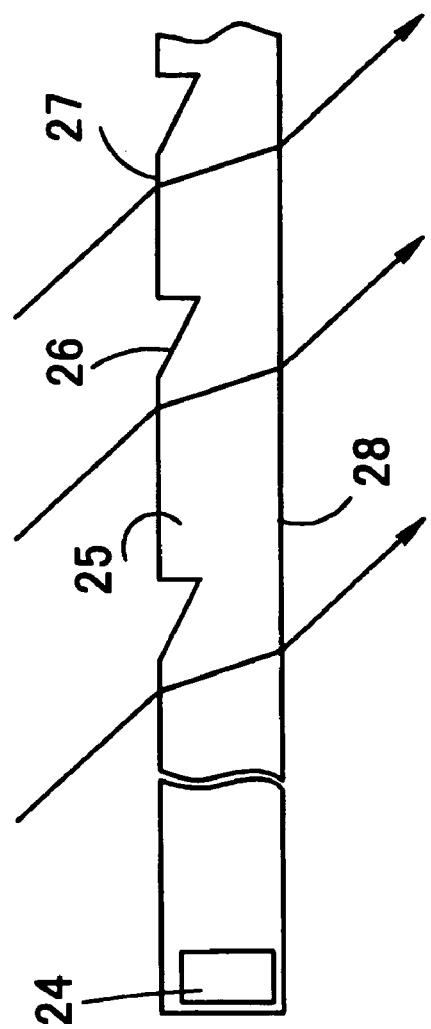
Fig. 8A
Fig. 8B

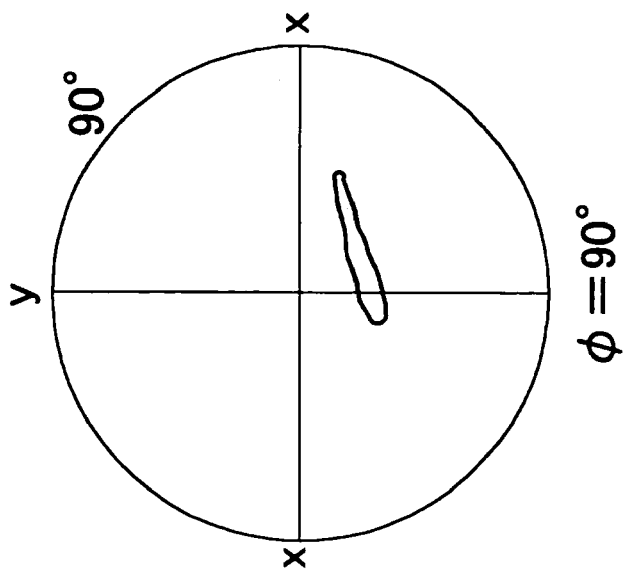
Fig. 17A  φ=0°
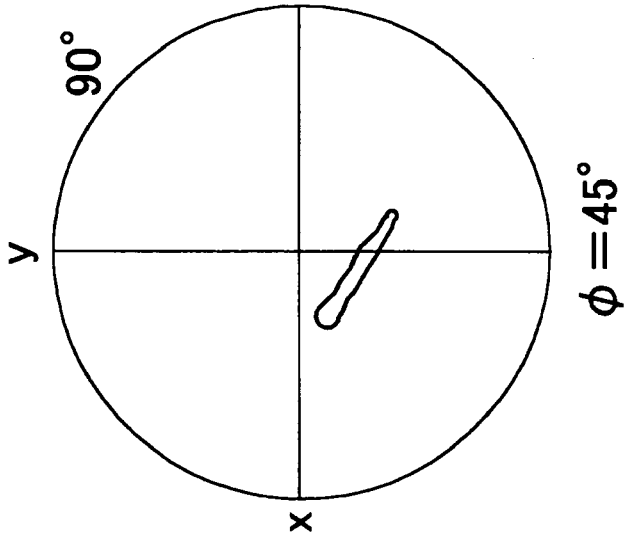
Fig. 17B  φ=45°
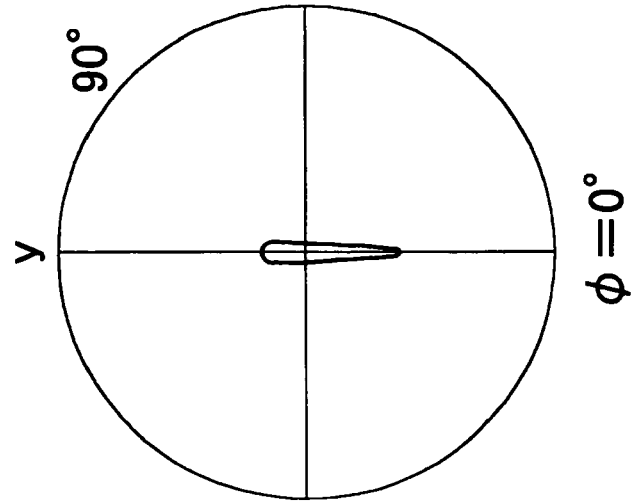
Fig. 17C  φ=90°

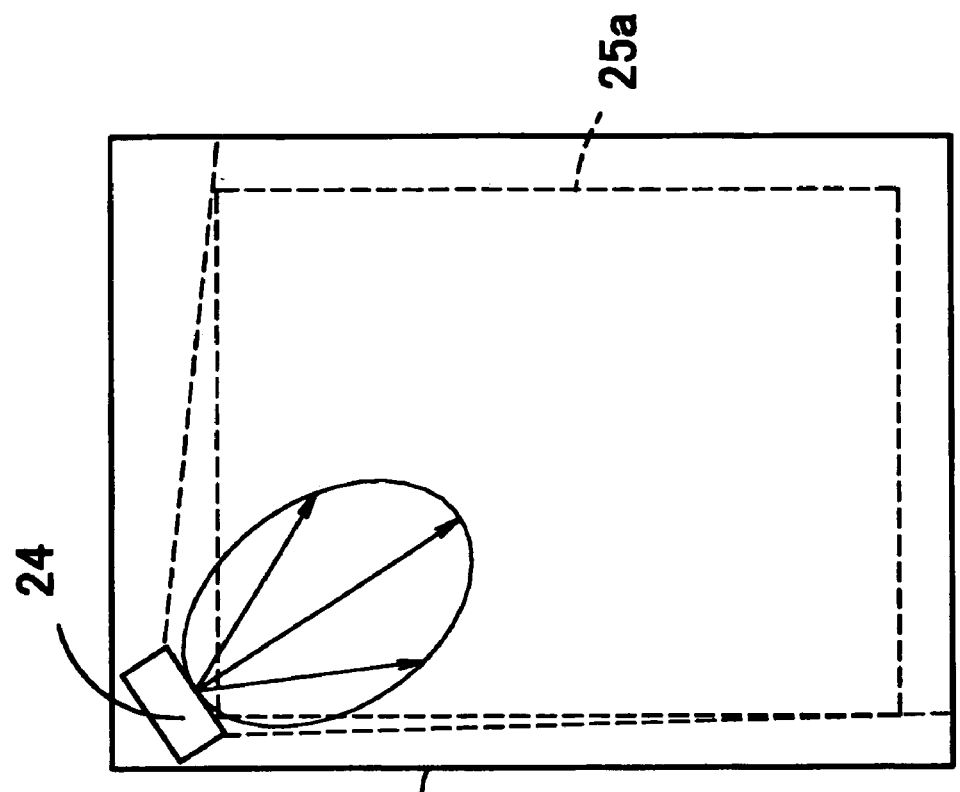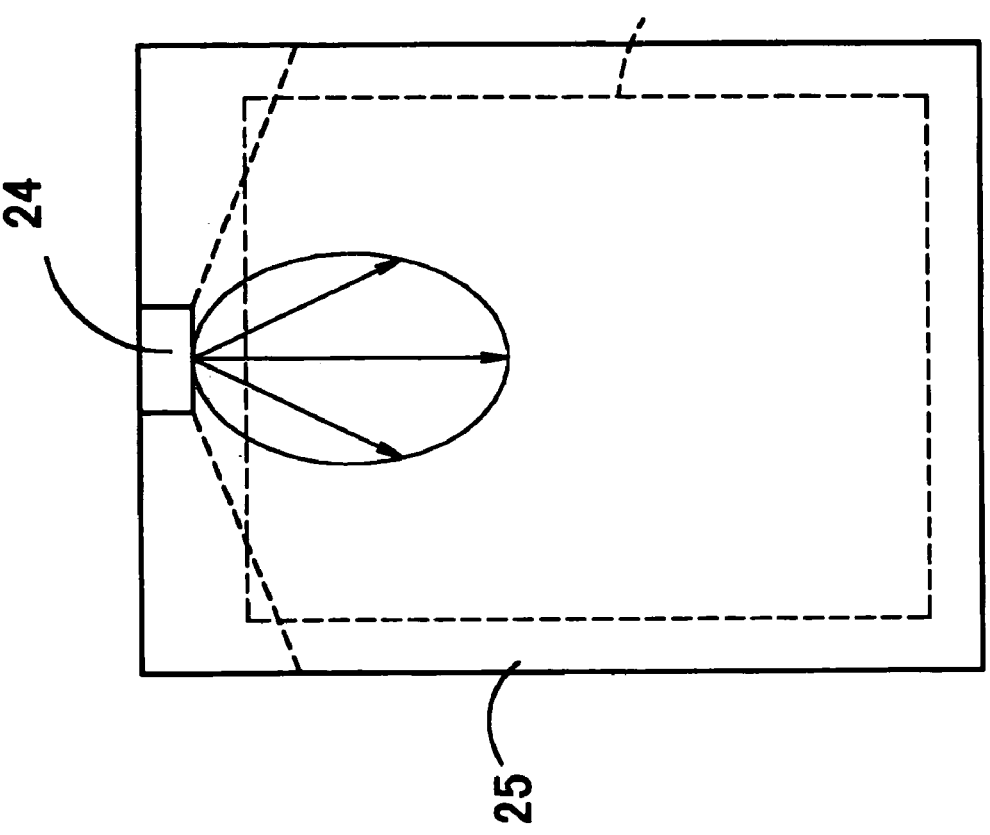

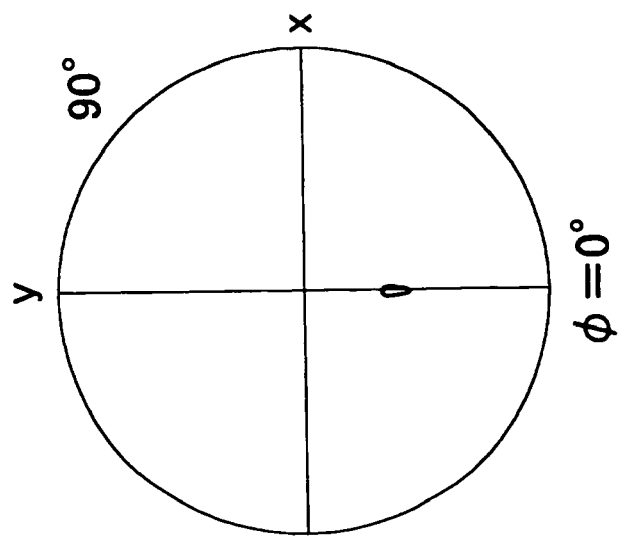
Fig. 24A  φ=0°
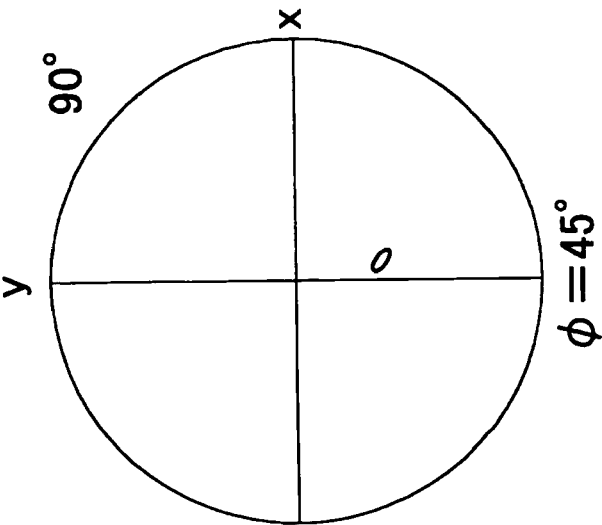
Fig. 24B  φ=45°
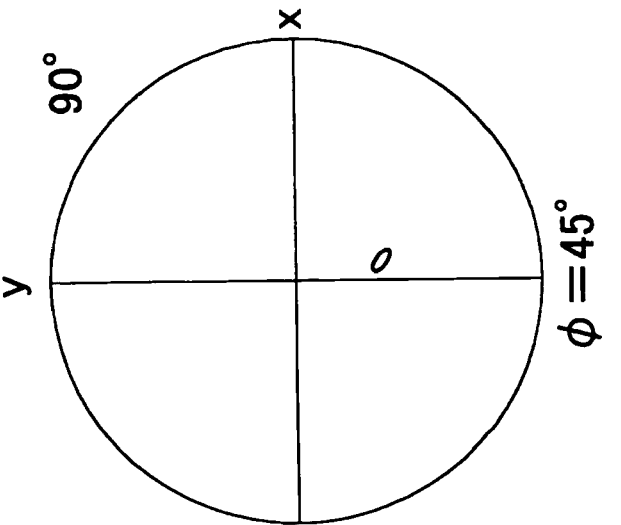
Fig. 24C  φ=90°

Fig. 27A  Vertical direction
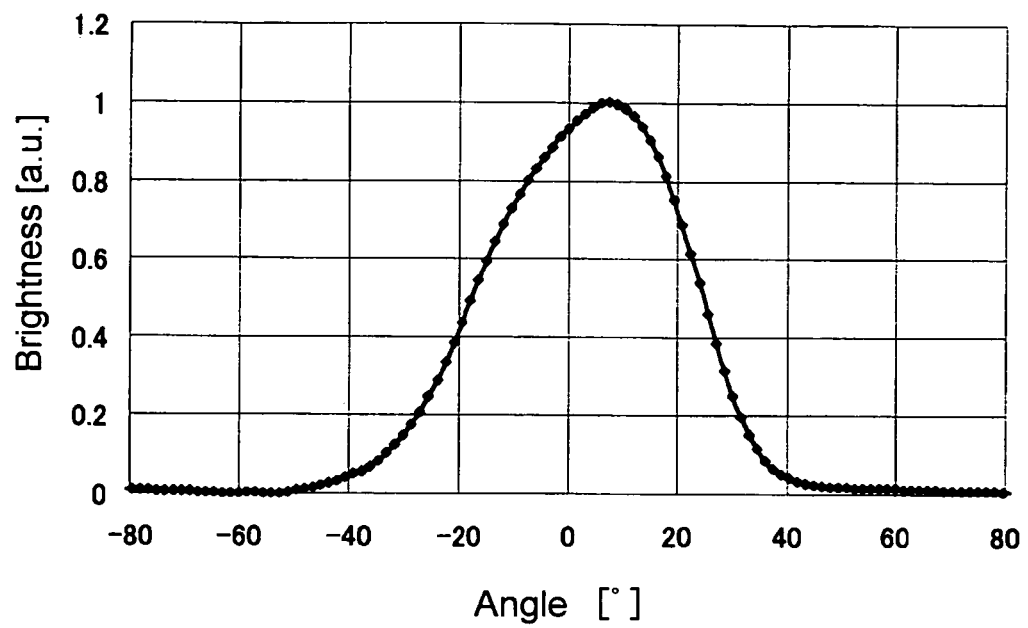
Fig. 27B  Lateral direction
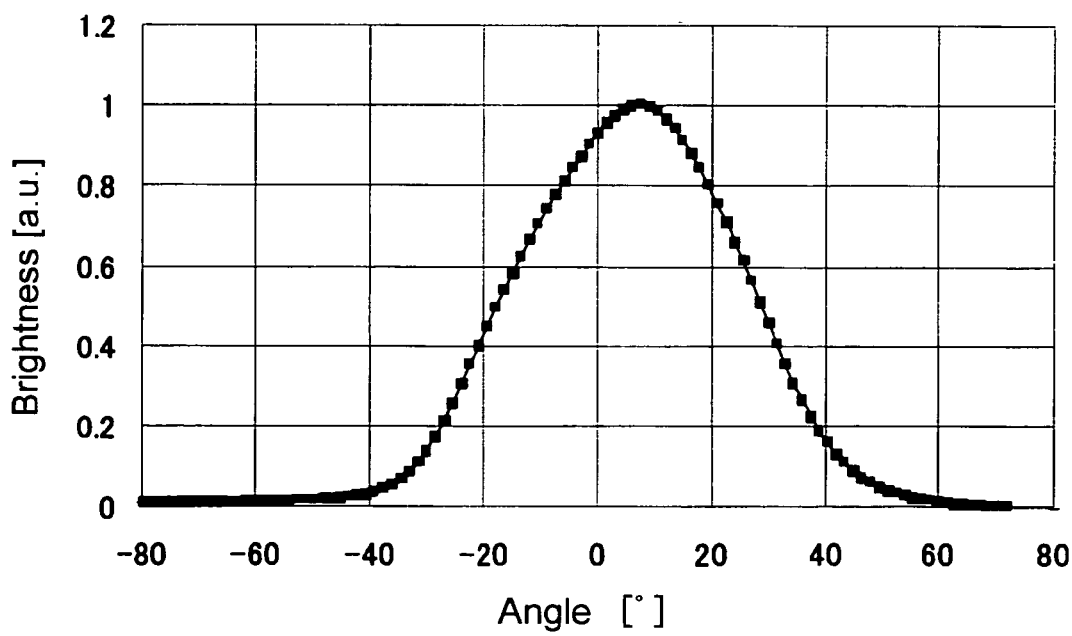

FRONT LIGHT, REFLECTIVE TYPE OF DISPLAY, AND LIGHT CONTROLLING METHOD

BACKGROUND OF THE INVENTION

1. Field of the Invention

The present invention relates to a front light, a reflective type of display and a light controlling method in the front light.

2. Description of the Prior Art

FIG. 1 shows a schematic sectional view of a reflective type of liquid crystal display 1 comprising a front light 2 and a reflective type of liquid crystal display panel 3. According to the reflective type of liquid crystal display 1 using the front light 2, the light emitted from a light emission surface 6 of the front light 2 is roughly divided into two. That is, one is image light 8 which is emitted from a linear light source 4 such as a cool cathode ray tube, propagated in an optical waveguide 5, emitted almost vertically from the light emission surface 6, passes through a glass substrate and a liquid crystal layer of the liquid crystal display panel 3, reflected by a reflection surface 7 to the original position, passes through the liquid crystal display panel 3 and the front light 2, and then emitted toward an viewer as shown by an arrow of a solid line in FIG. 1. The other is noise light 9 which is reflected by the light emission surface 6 of the front light 2 or a glass substrate surface of the liquid crystal display panel 3 and emitted to the viewer as shown by an arrow of a broken line in FIG. 1.

When the noise light 9 is generated, as shown in FIG. 1, since the image light 8 and the noise light 9 is emitted in the same direction, white light overlaps with the image generated by the liquid crystal display panel 3, causing a contrast of a screen and visibility to be lowered.

FIG. 2 shows a schematic sectional view of a reflective type of liquid crystal display 10 provided so as to prevent the visibility from deteriorating. According to this reflective type of liquid crystal display 10, patterns 11 having sections in the shape of cutting blade are formed on the surface (the surface opposed to the light emission surface 6) of the optical waveguide 5 parallel to the light source 4 (vertical to the light), and the light propagated in the optical waveguide 5 is totally reflected by the pattern 11 and emitted from the light emission surface 6 of the optical waveguide 5 in the oblique direction. Therefore, even when the light emitted from the light emission surface 6 is reflected by the light emission surface 6, or the light emitted from the light emission surface 6 is reflected by the surface of the liquid crystal display panel 3, the noise light 9 (regular reflection light) is emitted to the viewer in the oblique direction and it is not likely to be directly input to the eye of the viewer. Therefore, the noise light 9 in the front screen direction is reduced and the contrast of the screen is improved. Since the light emitted from the light emission surface 6 in the oblique direction passes through the liquid crystal layer of the liquid crystal display panel 3 and then reflected by the reflection surface 7 having an appropriate inclination angle in the vertical direction and becomes the image light 8 in the front screen direction, brightness in the front screen direction can be maintained and the visibility is improved.

The structure of the optical waveguide shown in FIG. 2 can be employed in a case a linear light source comprising a cool cathode ray tube, a waveguide rod or a plurality of point light sources is used as the light source of the front light. However, when the point light source is used, since the light emitted from a point light source 12 radiates from the point light source 12 in the optical waveguide 5 as shown in FIG. 3, the directions of the light reflected by the patterns 11 having the shape of cutting blade and emitted from the light emission surface 6 are not uniform in the light emission surface 6. In addition, when the inclination directions of the reflection surface 7 have to be differentiated depending on their positions in order to make the light which is not emitted unidirectionally, be uniformly reflected in the vertical direction, the configuration of the reflection surface 7 becomes complicated. Therefore, it becomes difficult to design and manufacture the reflection surface and align the position of the reflection surface with the front light.

In addition, even when the configuration of the reflection surface 7 can be manufactured corresponding to the directions of the light of the point light source 12 emitted from the light emission surface 6, since an incident angle of the outside light such as sunlight is aligned in one direction, when the outside light is reflected by the reflection surface 7 whose inclination direction is varied in accordance with the front light using the point light source 12, the light is reflected by the reflection surface 7 in various directions so that brightness becomes uneven in the screen in the case of the outside light.

SUMMARY OF THE INVENTION

The present invention was made in view of the above technical problems and it is an object of the present invention to provide a front light using a so-called point light source in which image light and noise light is prevented from being emitted in the same direction and a difference in illumination between a case by a front light and a case by the outside light is reduced.

According to an embodiment of the present invention, a front light comprises an optical waveguide in which light input from a light input surface is confined, propagated and emitted from a light emission surface, and a point light source arranged at a position opposed to the light input surface, in which the direction in which intensity of the light emitted from the light emission surface becomes a maximum is obliquely inclined from a normal direction of the light emission surface, and the light intensity maximum direction is aligned almost one direction in the light emission surface.

According to an embodiment of the present invention, a reflective type of display comprises a front light, and a reflective type of display panel arranged on the light emission surface side of the front light and having a reflection surface for reflecting the light emitted from the light emission surface.

According to an embodiment of the present invention, in a front light comprising an optical waveguide in which light input from a light input surface is confined, propagated and emitted from a light emission surface, and a point light source arranged at a position opposed to the light input surface, the direction in which intensity of the light emitted from the light emission surface becomes a maximum is obliquely inclined from a normal direction of the light emission surface, and the light intensity maximum direction is aligned almost one direction in the light emission surface.

BRIEF DESCRIPTION OF THE DRAWINGS

FIG. 8A shows a view of light emitted from the front light and FIG. 8B shows a view of light input to the front light.

FIGS. 17A, 17B and 17C show views each showing results in which light intensity distribution of emission light at positions in the directions F=0°, 45° and 90° around a point light source is simulated.

FIG. 22A shows a plan view of a state in which the point light source is set in the center of an upper end of the point light source, and FIG. 22B shows a plan view of a state in which the point light source is set at the corner of the upper end of the optical waveguide.

FIGS. 24A, 24B and 24C show views each showing results in which light intensity distribution of emission light at positions in the directions F=0°, 45° and 90° around a point light source is simulated.

FIG. 27A and FIG. 27B show graphs showing results in which brightness distribution of light emitted from a front surface is measured with the above reflective type of liquid crystal display.

DESCRIPTION OF THE PREFERRED EMBODIMENTS

Embodiments of the present invention are described with reference to the drawings hereinafter.

(Embodiment 1)

Figure 1:
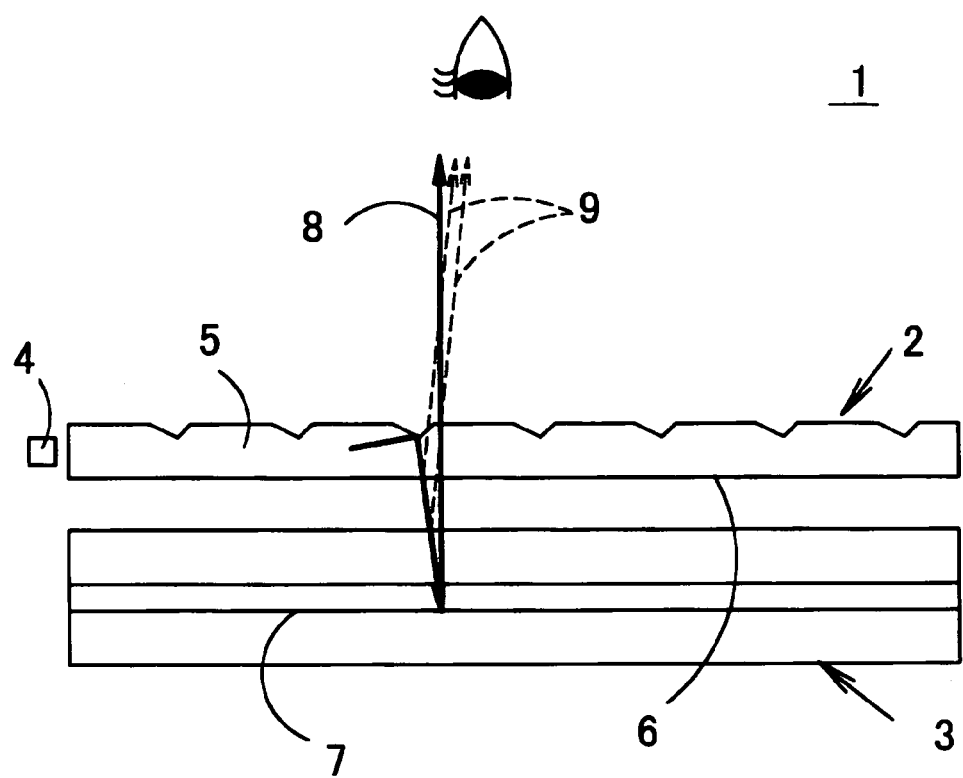
FIG. 1 shows a schematic sectional view of a conventional reflective type of display.
Figure 2:
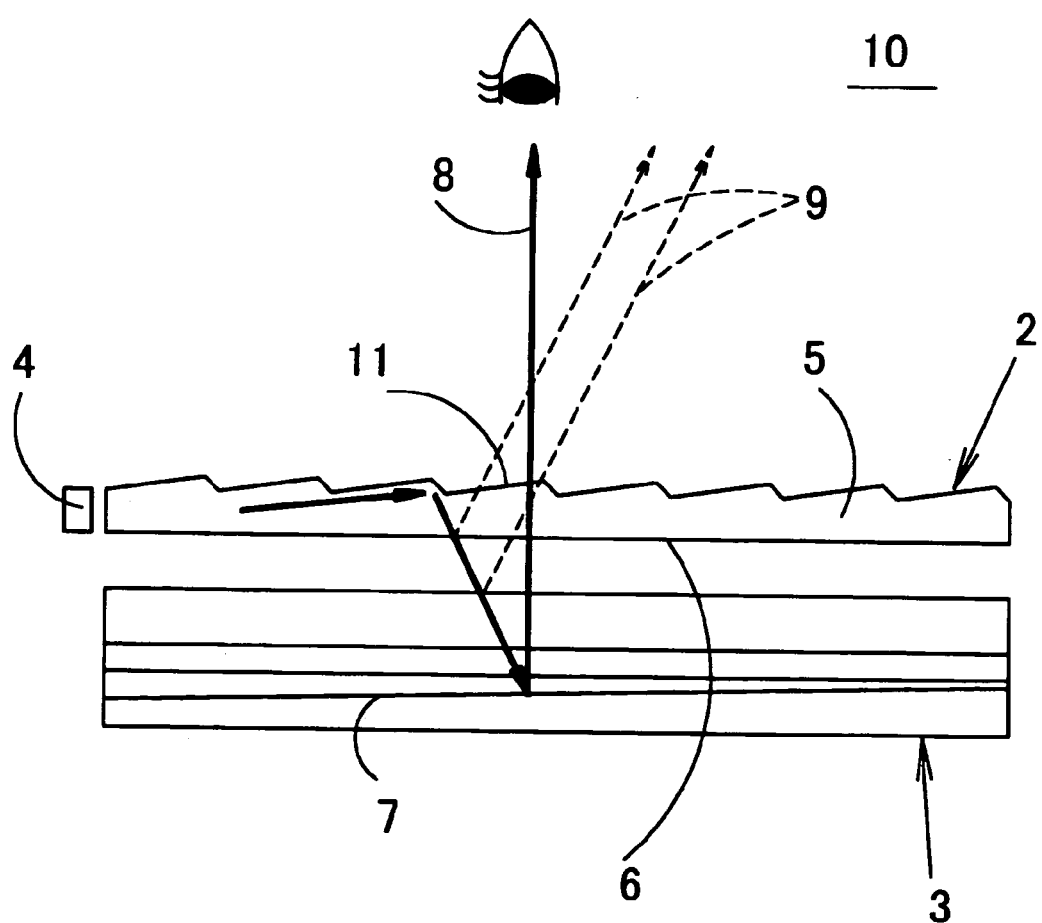
FIG. 2 shows a schematic sectional view of another conventional reflective type of display in which visibility is prevented from deteriorating.
Figure 3:
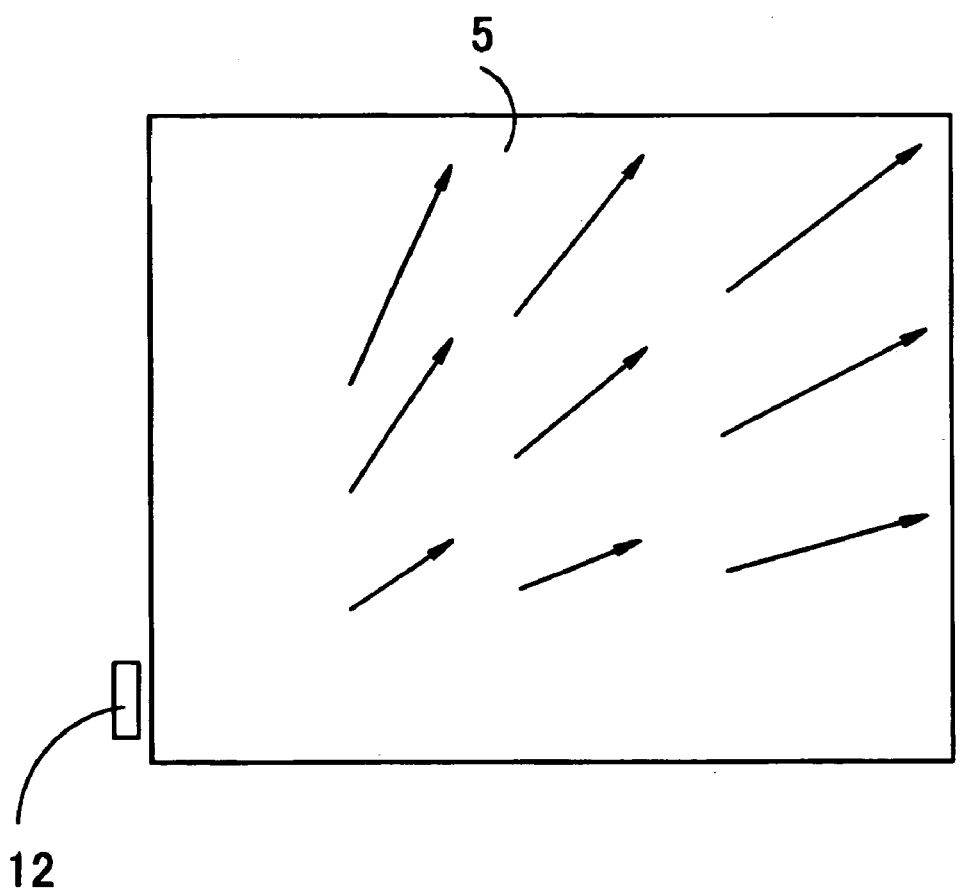
FIG. 3 shows a schematic plan view of a behavior of light emitted from a point light source in a front light using the point light source.
Figure 4:
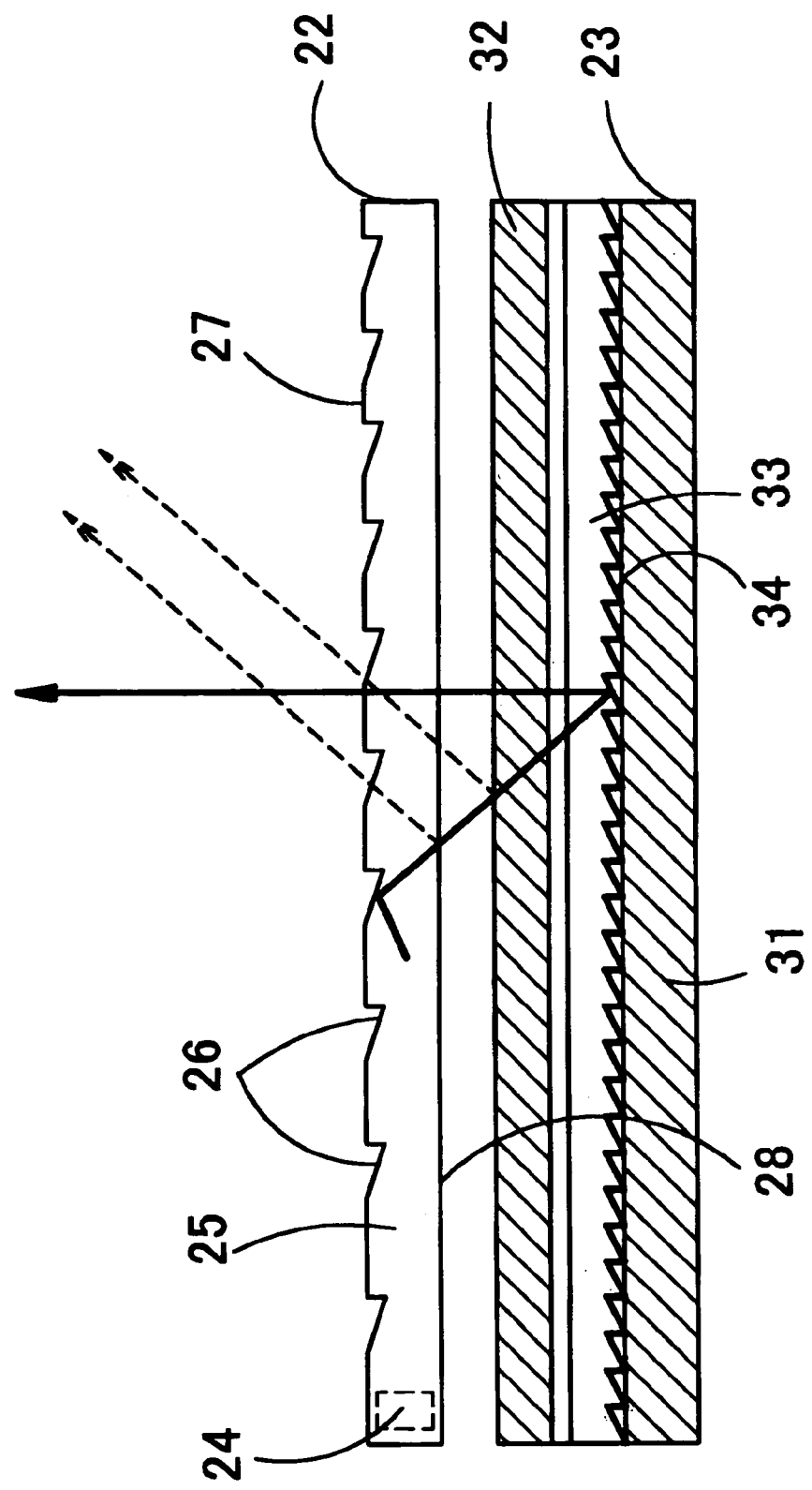
FIG. 4 shows a schematic sectional view of a reflective type of liquid crystal display according to an embodiment 1 of the present invention.
Figure 5:
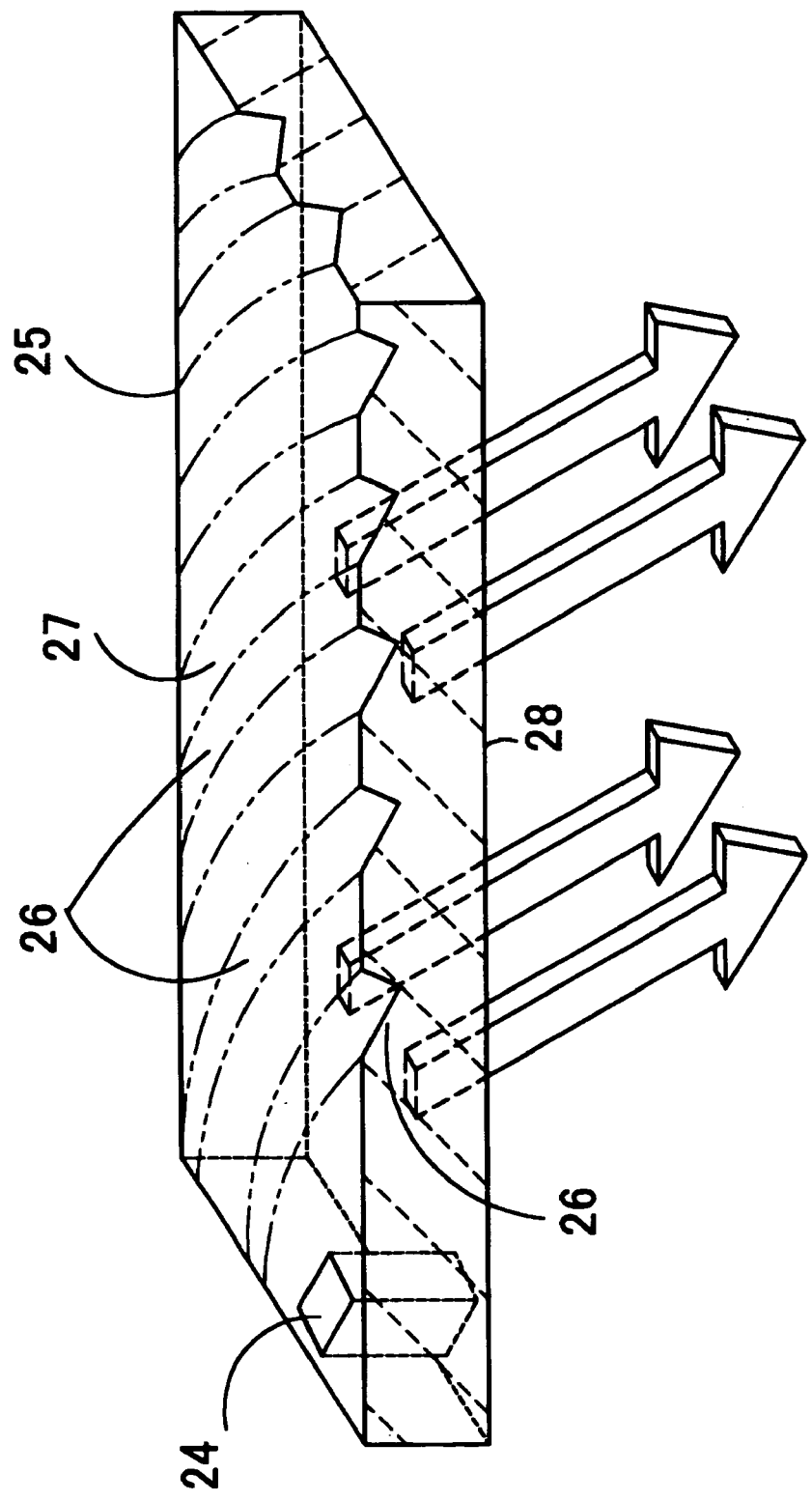
FIG. 5 shows a partially broken schematic perspective view of the front light used in the above reflective type of liquid crystal display.
Figure 6:
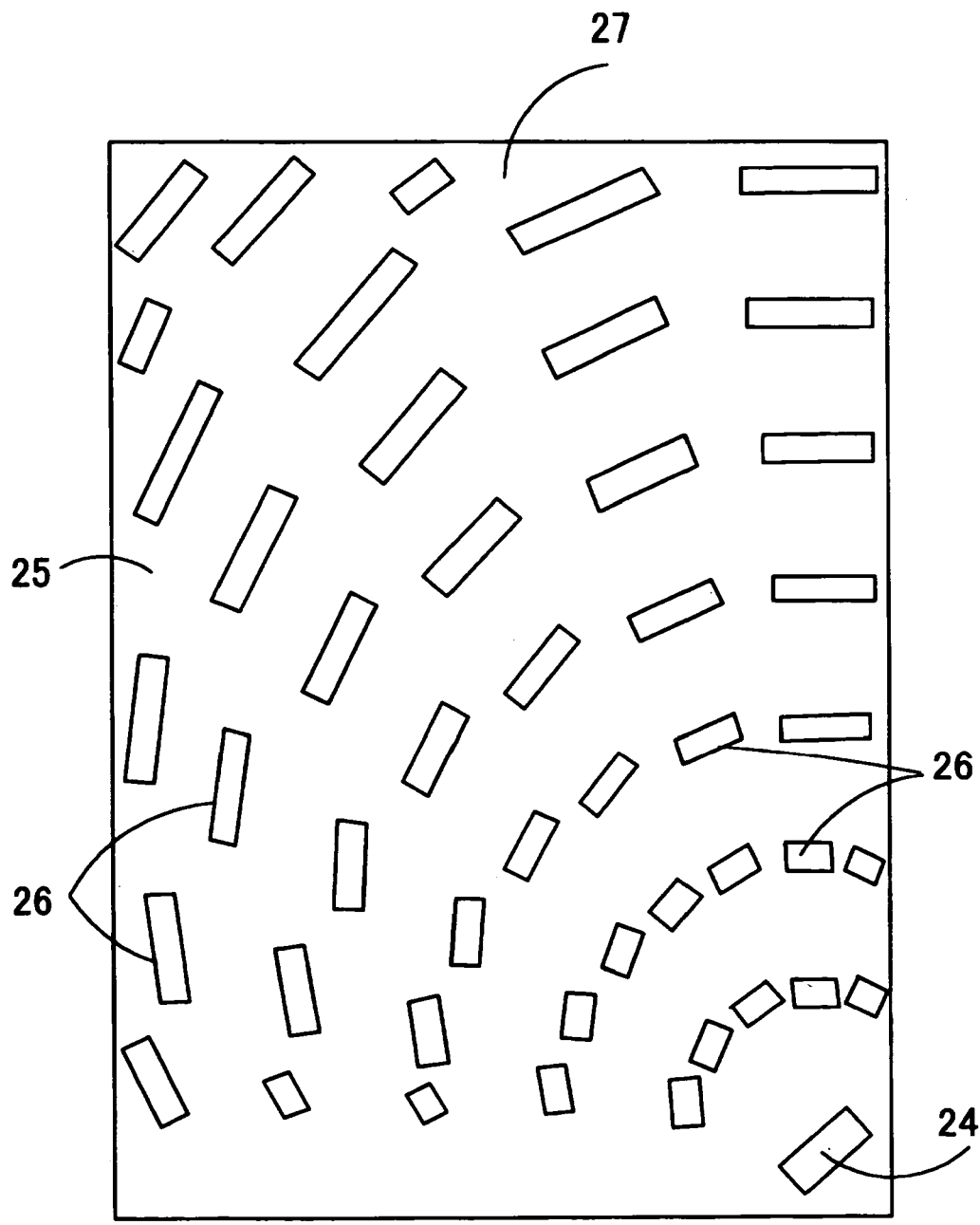
FIG. 6 shows a plan view of the above front light.

FIG. 4 shows a schematic sectional view of a reflective type of liquid crystal display 21 in which a front light 22 according to an embodiment 1 of the present invention is arranged on a front surface of a reflective type of liquid crystal display panel 23. FIG. 5 shows a partially broken schematic perspective view of the front light 22 and FIG. 6 shows its plan view.

The front light 22 comprises a point light source 24 in which a light emitting element such as a light-emitting diode is sealed, and an optical waveguide 25 formed by a method such as injection molding with a transparent resin such as a polycarbonate resin, an acrylic resin or a methacrylic resin. The point light source 24 is arranged at a corner outside of an effective emission region 25a (refer to FIG. 10) of the optical waveguide 25 and a plurality of deflection patterns 26 for totally reflecting light emitted from the point light source 24 and propagating in the optical waveguide 25 are formed on an upper surface of the optical waveguide 25. Although the point light source 24 is provided in the optical waveguide 25 in FIGS. 5 and 6, it may be disposed in the vicinity of the corner of the optical waveguide 25 outside of the optical waveguide 25. As shown in FIG. 6, the deflection patterns 26 are concaved in the upper surface of the optical waveguide 25 in the shape of V so as to be almost concentrically arranged with the point light source 24 centered.

In addition, in order to uniformize intensity distribution of the light emitted from a light emission surface 28 of the optical waveguide 25, a surface density of the deflection pattern 26 is small in the vicinity of the point light source 24 and the surface density is increased with the increase in distance from the point light source 24.

Figure 7:
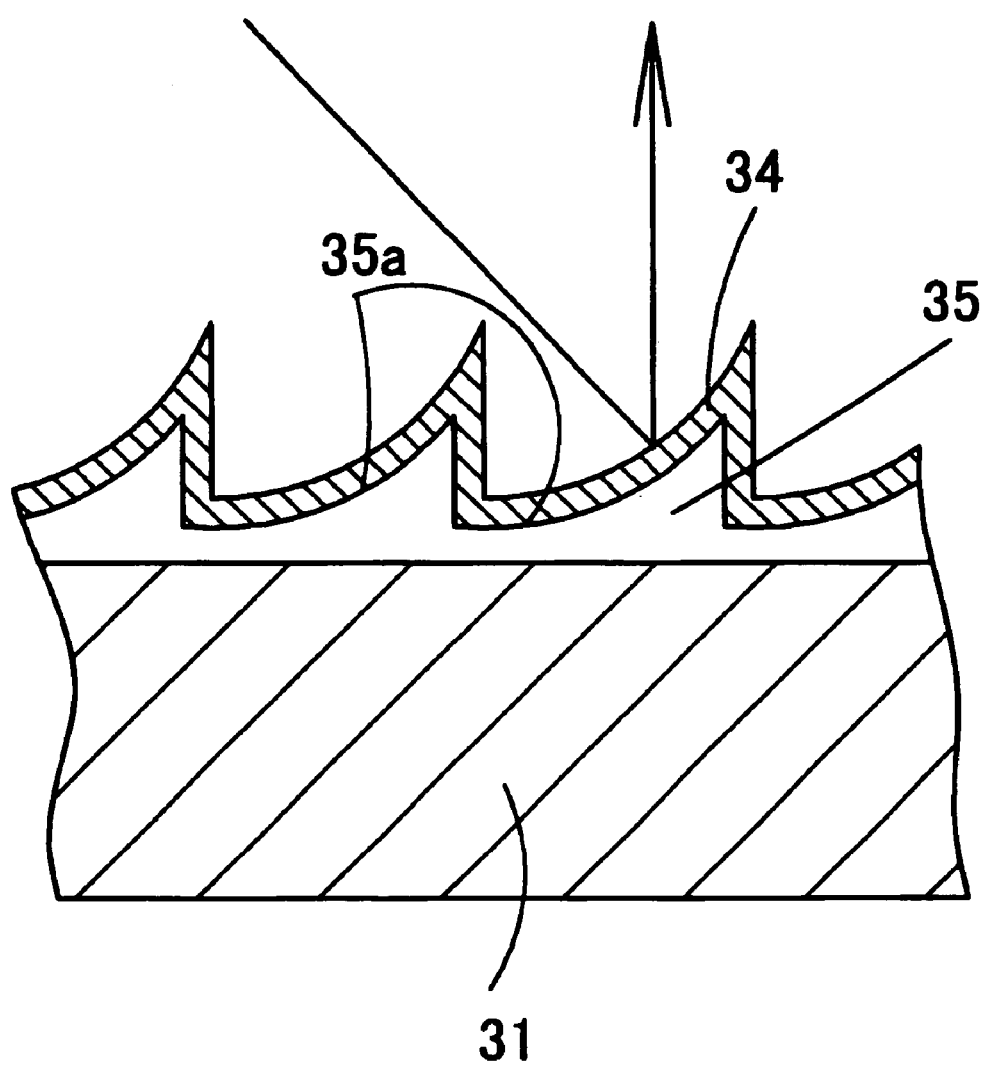
FIG. 7 shows a partially broken enlarged sectional view of a reflection surface formed on a back surface substrate in a liquid crystal display panel.

According to the reflective type of liquid crystal display panel 23 shown in FIG. 4, a liquid crystal material 33 is sealed between aback surface substrate 31 in which a TFT electrode is formed and a glass substrate 32 in which a transparent electrode is formed, and a reflection surface 34 is formed on the back surface substrate 31. As shown in FIG. 7, an insulating material layer 35 is formed on the back surface substrate 31, and a plurality of inclination patterns 35a each having the same configuration are arranged on the insulating material layer 35. The reflection surface 34 is formed by forming a deposited film of metal such as aluminum on the surface of the insulating material layer 35.

In addition, a deflection plate or the like is provided on the glass substrate 32 although it is not shown in the drawing.

Thus, when the point light source 24 of the front light 22 is turned on, as shown in FIGS. 8A and 5, the light emitted from the point light source 24 and input in the optical waveguide 25 (which is shown by arrows and so on) is confined in the optical waveguide 25, repeatedly reflected totally between a surface 27 and the light emission surface 28 (back surface) of the optical waveguide 25, propagated in the direction getting away from the point light source 24 and spreads in the optical waveguide 25. When the light is totally reflected by an inclination surface 29 of the deflection pattern 26, it proceeds to the light emission surface 28 of the optical waveguide 25, emitted from the light emission surface 28 toward the liquid crystal display panel 23 and illuminates the liquid crystal display panel 23. According to the front light 22 of the present invention, the light emitted from the light emission surface 28 is obliquely inclined from the normal direction of the light emission surface 28 in the same direction regardless of its emitted position.

In addition, when the point light source 24 is not turned on and the liquid crystal display panel 23 illuminated with outer light such as sunlight, as shown in FIG. 8B, the outer light input from the surface 27 of the optical waveguide 25 passes through the optical waveguide 25 and it is emitted from the light emission surface 28 to illuminate the liquid crystal display panel 23.

When the light from the point light source 24 is obliquely emitted from the light emission surface 28 of the optical waveguide 25 as shown in FIG. 4, the emitted light passes through the glass substrate 32 and the liquid crystal material 33 of the liquid crystal display panel 23 and it is reflected by the reflection surface 34. Since the reflection surface 34 is inclined downward in the incident direction of the emitted light, the light obliquely input from the front light 22 is reflected by the reflection surface 34 in the almost perpendicular direction to the surface as shown in FIG. 7. The image light reflected by the reflection surface 34 almost perpendicularly passes through the liquid crystal material 33, the glass substrate 32, the optical waveguide 25 and the like, and emitted toward a front screen of the reflective type of liquid crystal display 21 so that brightness in the front screen direction can be increased.

The reflective type of liquid crystal display 21 having the above constitution has the following characteristics. Since the light emitted from the light emission surface 28 of the front light 22 is obliquely inclined from the normal direction of the light emission surface 28 and the inclined incident light is reflected by the reflection surface 34 in almost the perpendicular direction and the image light is emitted toward the front screen, even when the light obliquely emitted from the light emission surface 28 is reflected by the light emission surface 28 or the surface of the glass substrate 32, such noise light is emitted in the oblique direction outside of an viewing angle as shown by broken arrows in FIG. 4, so that the image light does not overlap with the noise light and a display screen having high contrast can be provided.

In addition, as shown in FIG. 5, since the light is obliquely emitted from the light emission surface 28 in the same direction, the reflection surface 34 only have to be unidirectionally inclined, so that the structure of the reflection surface 34 is not complicated. Furthermore, since the light of the point light source 24 emitted from the light emission surface 28 of the optical waveguide 25 is aligned in one direction like the outside light and each pattern 35a of the reflection surface 34 is unidirectionally inclined, even when the outside light unidirectionally aligned is reflected by the reflection surface 34, the reflected light is also unidirectionally aligned, so that brightness is not likely to become uneven and the screen can be brightened. Still further, since the reflection surface 34 is inclined by the plural number of inclined patterns 35a, a thickness of the liquid crystal display panel 23 can be reduced (in case of one inclined reflection surface, the thickness of the liquid crystal display panel 23 is increased). In addition, since each inclined pattern 35a is curved in the shape of a concave, the reflection light is slightly diffused so that the outside light or scenery is prevented from being caught by the reflection surface 34.

Figure 9:
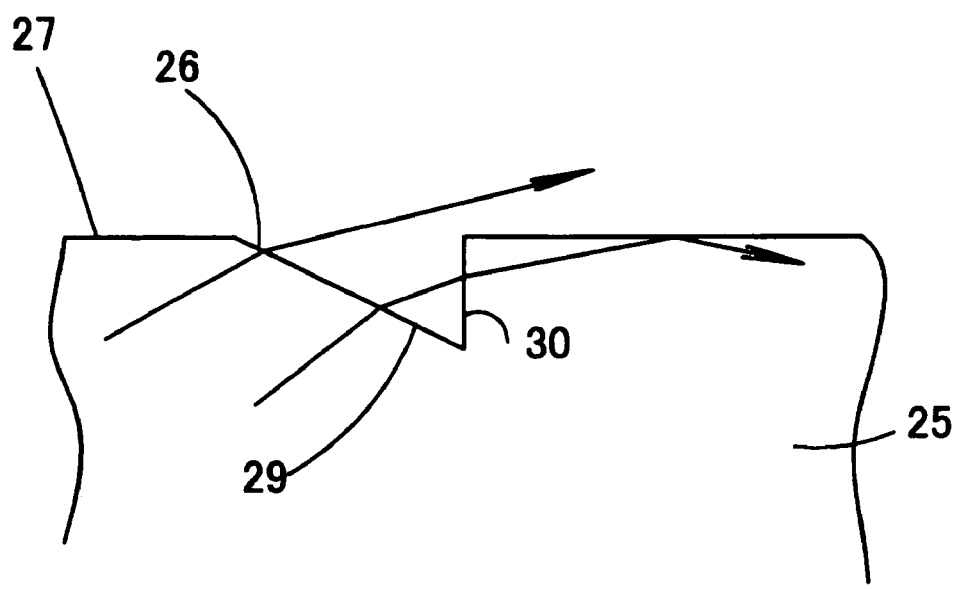
FIG. 9 shows an explanatory diagram of a behavior of light leaked from an inclination surface of a deflection pattern.

FIG. 9 shows a case where light is input from the inside of the optical waveguide 25 toward the inclination surface 29 of the deflection pattern 26 at an incident angle (which is on the basis of a normal line of the inclination surface 29) smaller than a critical angle of total reflection. The light reached the inclination surface 29 passes through the inclination surface 29 and emitted from the surface 27 of the optical waveguide 25 in the oblique direction. In addition, after the light is emitted from the inclination surface 29, the light is partially input to a trapping surface 30 which is provided at the end of the inclination surface 29 and returns into the optical waveguide 25 again to be reused.

In a case a liner light source such as a cool cathode ray tube is used in the front light (not shown), when the light is directly leaked from the inclination surface 29 as shown in FIG. 9, since the leaked light is aligned in one direction in the optical waveguide 25, the screen becomes white when viewed in a certain direction and the screen is not visible any more in that direction.

Figure 10:
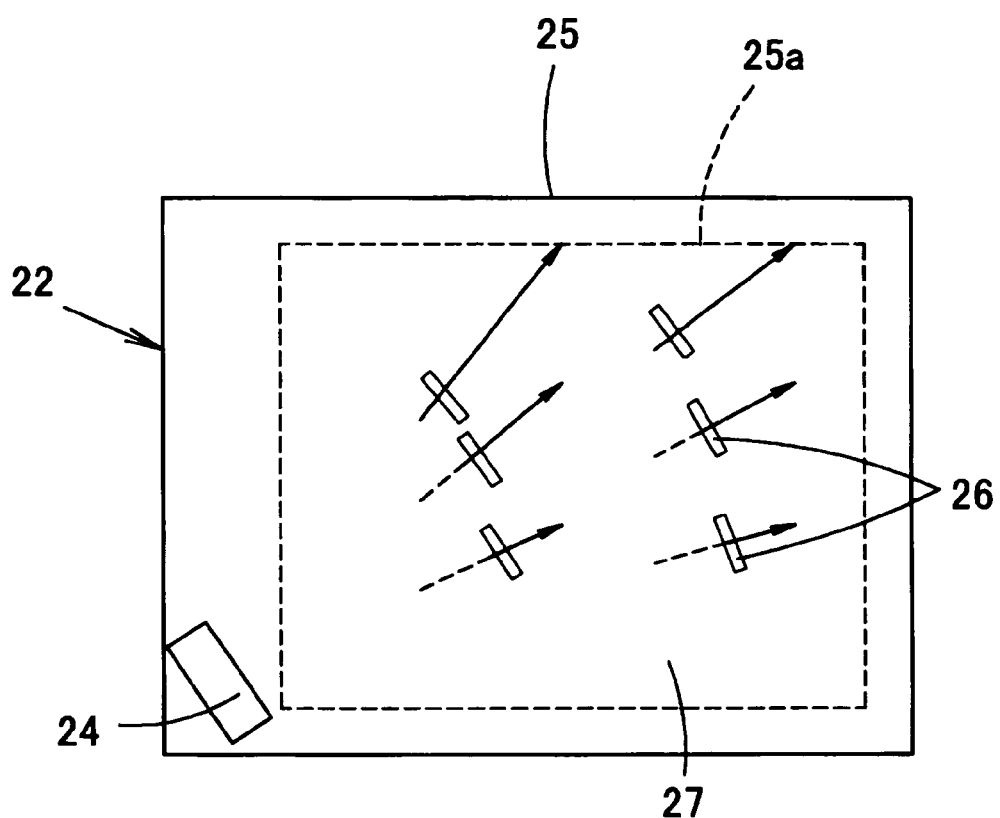
FIG. 10 shows a view of directions of light of the front light propagated in an optical waveguide and light leaked from its surface.

Meanwhile, according to the front light 22 using the point light source 24, as shown in FIG. 10, since the light propagated in the optical waveguide 25 radiates from the point light source 24, the noise light directly leaked from the inclination surface 29 of the deflection pattern 26 is not aligned in one direction unlike the case the linear light source is used, and emitted from the point light source 24 in the radius direction. Therefore, since the emitted direction of the noise light depends on its position, the screen is not likely to become white unlike the case the linear light source is used, so that the screen is visible at large viewing angles.

Figure 11:
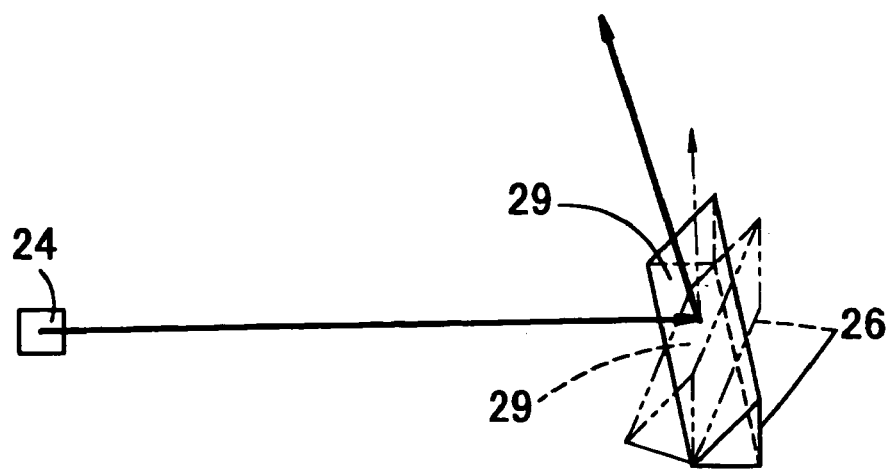
FIG. 11 shows a view of variation of directions of a deflection pattern and light reflected by the deflection pattern.

Then, a description is made of a structure in which the light from the point light source 24 is reflected by the deflection patterns 26 concentrically arranged from the point light source 24, and emitted from the light emission surface 28 so as to be aligned unidirectionally. In order to unidirectionally align the light emitted from the light emission surface 28, an angle formed between the light input into the deflection pattern 26 and the normal line of the inclination surface 29 is varied depending on the direction of the deflection pattern 26 viewed from the point light source 24. Since the angle of the light input to the inclination surface 29 of the deflection pattern 26 depends on the direction of the deflection pattern 26 viewed from the point light source 24 (or the direction of the point light source 24 viewed from the deflection pattern 26), the light emission direction can be controlled by varying the direction of the inclination surface 29 to vary the angle formed between the incident light and the formal line of the inclination surface 29, depending on the direction of the deflection pattern 26 viewed from the point light source 24, as shown in FIG. 11 (the deflection pattern 26 is viewed from the inside of the optical waveguide 25 with the back surface up in FIG. 11).

Figure 12:
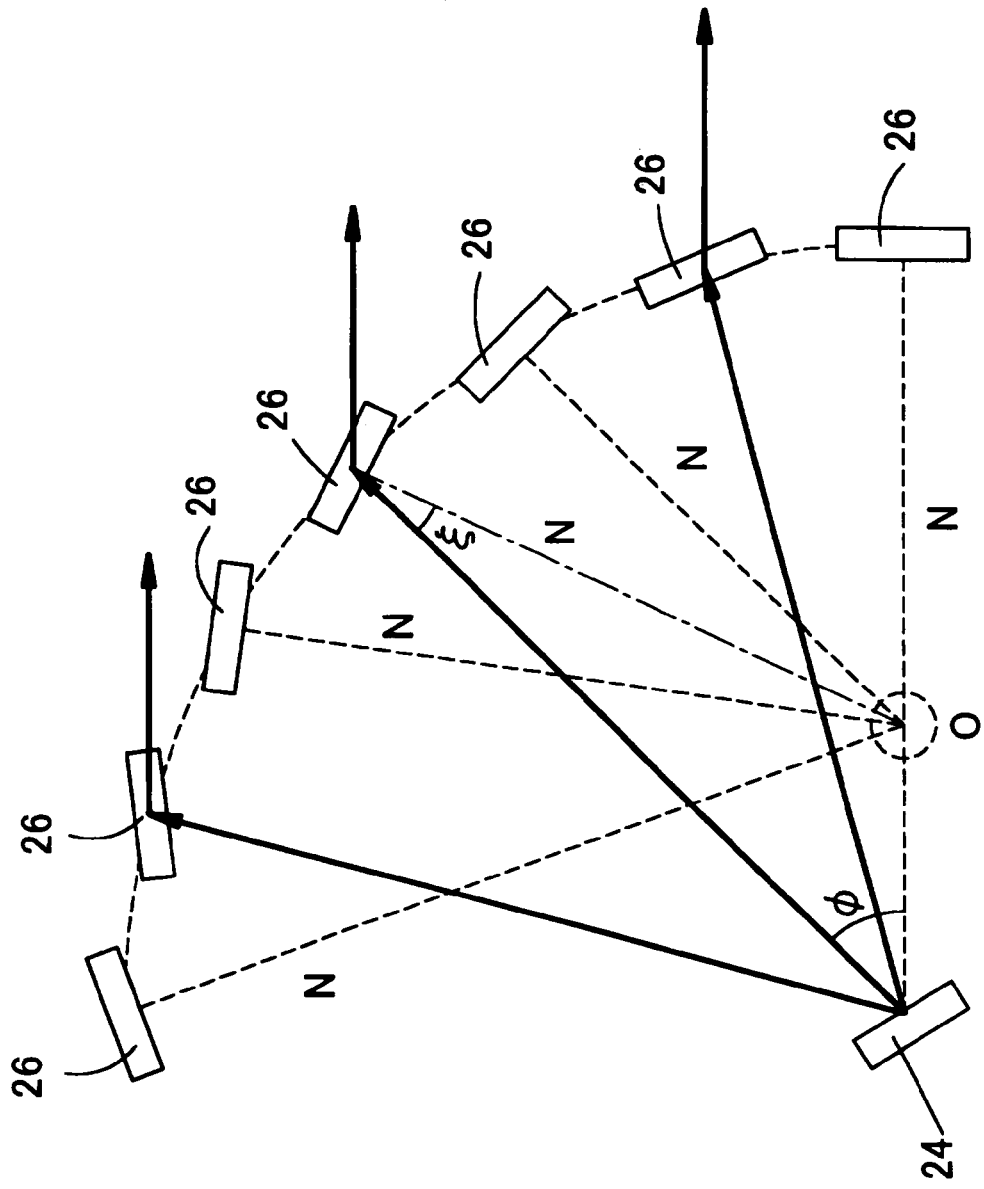
FIG. 12 shows a schematic plan view of a point light source, arrangement of the deflection patterns on the same circumference, and emission directions of the light reflected by the deflection patterns.

More specifically, as shown in FIG. 12, when the direction of each inclination surface is determined in such a manner that normal lines N of the inclination surfaces 29 of the deflection patterns 26 arranged on the same circumference with the point light source 24 centered may intersect with each other at almost one point O when viewed from the direction vertical to the light emission surface of the optical waveguide 25, the light emitted from the point light source 24 is reflected by the inclination surface 29 of each deflection pattern 26 and can be obliquely emitted from the light emission surface 28 in the same direction as shown in FIG. 12. Thus, by arranging the normal lines N such that they may intersect with each other at one point when viewed from the direction vertical to the light emission surface 28, the emission light can be almost unidirectionally aligned while the variation in direction of the light emitted from the light emission surface 28 can be prevented.

Figure 13:
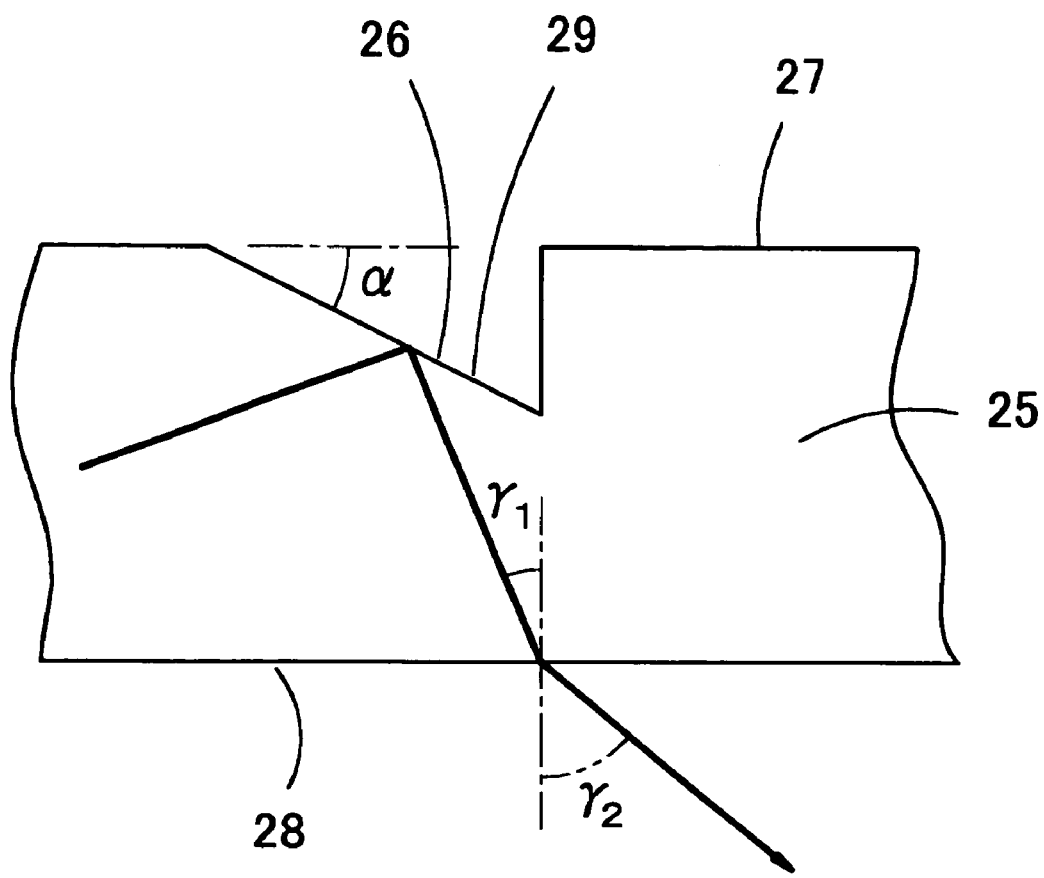
FIG. 13 shows a view for explaining incident angle γ1 used in an equation (1).

More specifically, in the case viewed from the direction vertical to the light emission surface 28 of the optical waveguide 25, when it is assumed that an angle formed between a line (which passes through the point light source 24, and is parallel with orthogonal projection to the light emission surface 28 in the direction of the light emitted from the light emission surface 28) connecting the intersection point 0 to the point light source 24 (the center of an emission region of the point light source), and a line connecting the point light source 24 (the center of the emission region of the point light source) to the deflection pattern 26 is set as F, an angle formed between the line connecting the point light source 24 to the deflection pattern 26, and the normal line N is set as ξ, and an incident angle of the totally reflected light by the inclination surface 29 into the light emission surface 28 is set as γ1 as shown in FIG. 13, in a case ξ and F satisfy the following equation (1), the normal lines N intersect with each other at one point O.

[Equation 1]

$$\xi = \arccos\left(\frac{1 - \cos\phi \cdot \sin\gamma}{\sqrt{1 + \sin^2\gamma_1 - 2 \cdot \sin\gamma_1 \cdot \cos\phi}}\right) \quad (1)$$

For example, when an outgoing angle γ2 of the light emitted from the light emission surface 28 is 20°, since it is satisfied that 1×sin γ2=n×sin γ1 (refraction index n of the optical waveguide 25 is equal to 1.53) by Snell's law, γ1 in the above equation (1) becomes 12.9°.

Figure 14:
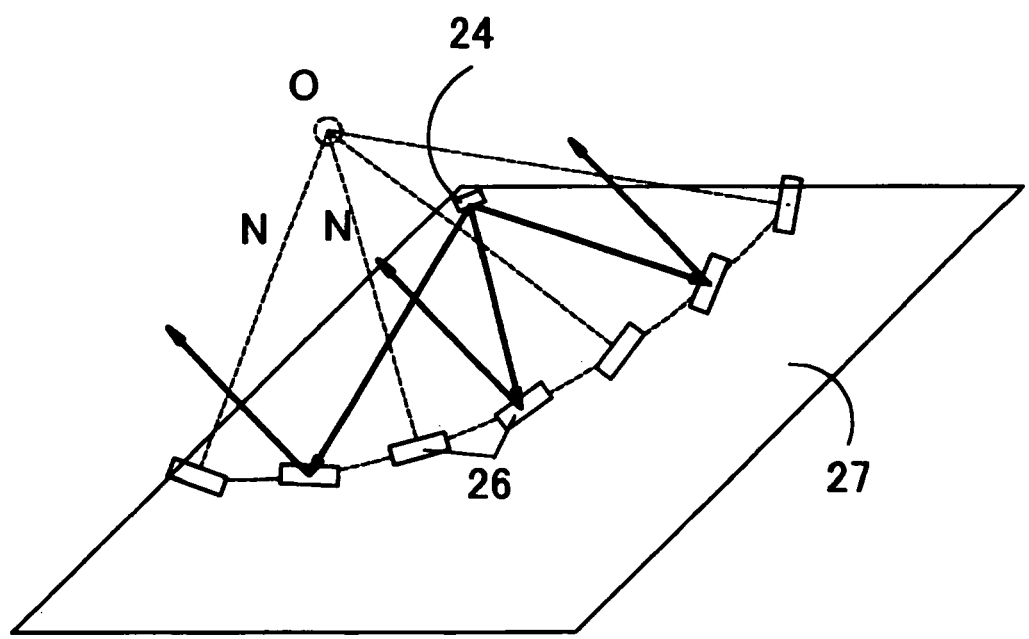
FIG. 14 shows a schematic view of a point light source, arrangement of the deflection patterns on the same circumference, and emission directions of the light reflected by the deflection patterns in three dimensions.

In addition, as shown in FIG. 13, the sectional configuration of the deflection pattern 26 is a right triangle, and an angle between the light emission surface 29 and the surface 27 of the optical waveguide 25 is as a=50°, and these are constant in all of the deflection patterns 26. In addition, the intersection point O of the normal lines N and the deflection pattern do not exist in the same plane and they are provided in three dimensions as shown in FIG. 14. It is preferable that the normal lines N of the inclination surfaces 29 of the deflection patterns 26 on the same circumference intersect with each other at one point O not only in a state viewed from the direction vertical to the light emission surface 28 but also in three dimensions. In addition, since the above equation (1) means that in each deflection pattern 26 positioned in the same direction viewed from the point light source 24 even on a different circumference, the direction of the normal line N of its inclination surface 29 is inclined from the direction connecting the point light source 24 to the deflection pattern 26 by the same angle of ξ when viewed from the direction vertical to the light emission surface 28, the intersection point O is not the same as that of the deflection pattern 26 on the different circumference.

Figure 15:
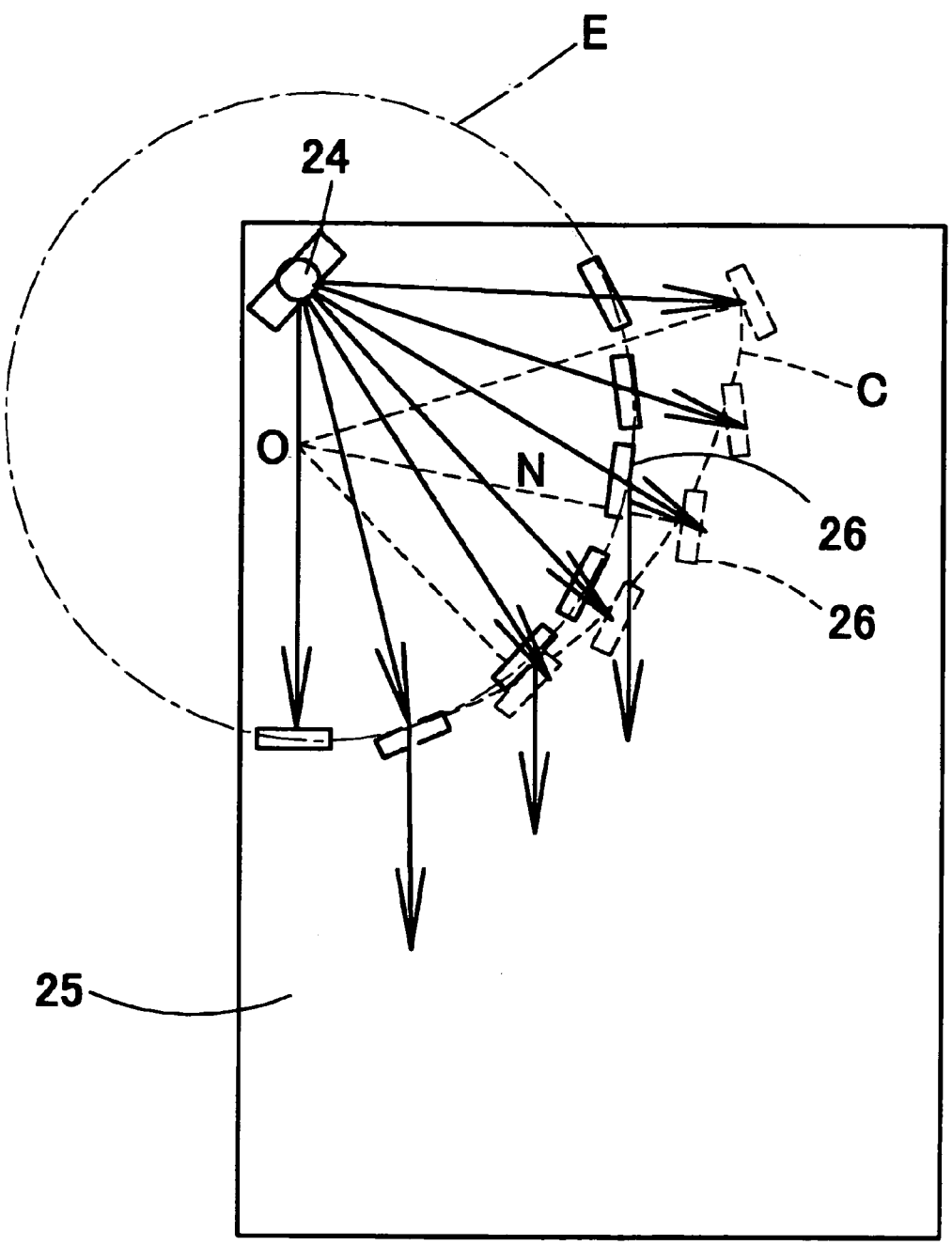
FIG. 15 shows a schematic plan view of another arrangement of the deflection patterns and the emission directions of the light reflected by the deflection patterns.

In addition, the same effect can be provided when in the arrangement direction of the deflection patterns 26, the longitudinal direction of each deflection pattern 26 on the same circumference C with the point light source 24 centered coincides with the tangent direction of an ellipse E at an intersection point of a line connecting the point light source 24 to each deflection pattern 26, with the ellipse E which focuses on the point light source 24 as shown in FIG. 15.

Figure 16:
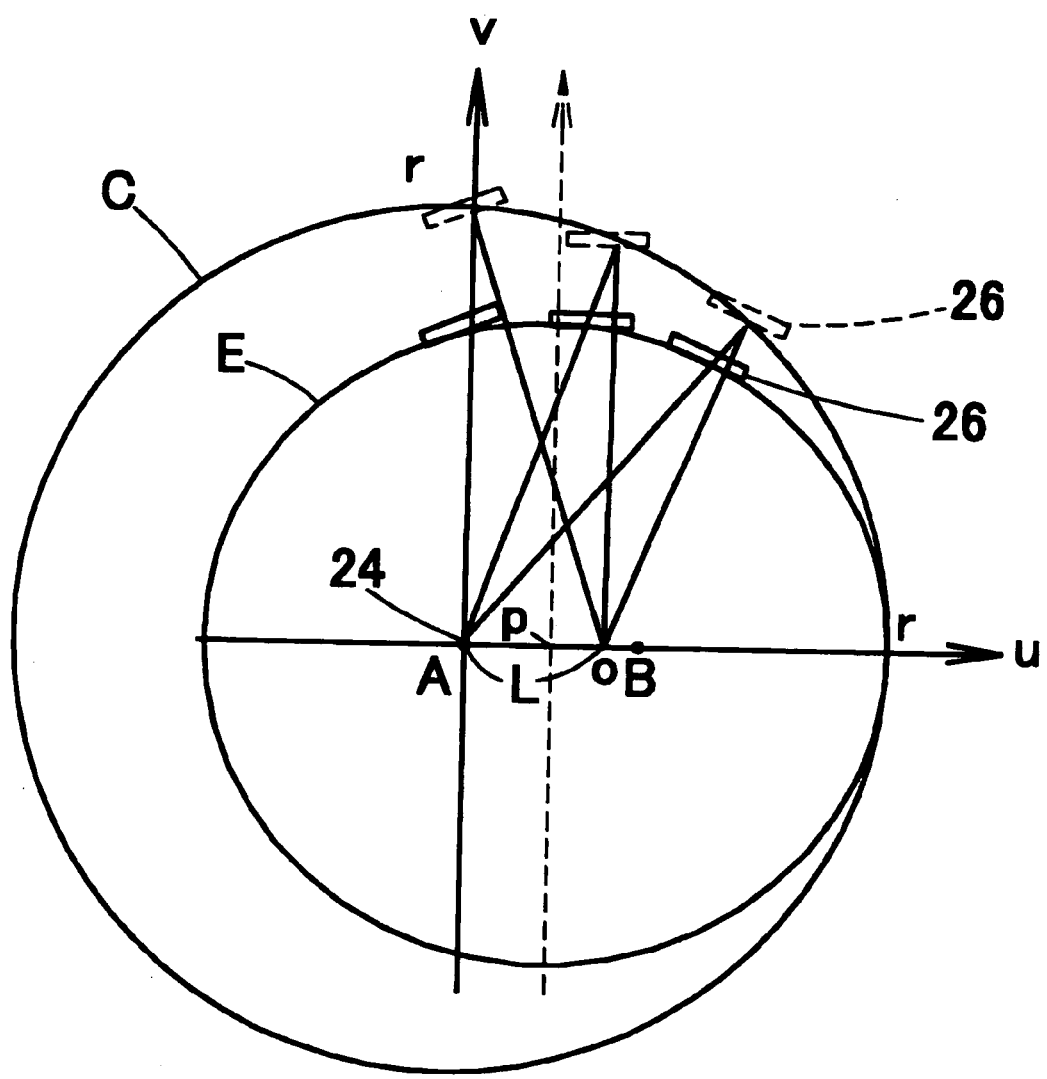
FIG. 16 shows a view for explaining the arrangement of the deflection patterns in FIG. 15.

More specifically, as shown in FIG. 16, the ellipse having the point light source 24 as one focus, and internally touching the circumference C with the point light source 24 centered in the longitudinal-axis direction is assumed, a line connecting the point light source 24 to any one of deflection patterns 26 is drawn, the tangent direction of the ellipse E at the intersection point of the line with the ellipse E is found and the direction of the deflection pattern 26 is decided such that the longitudinal direction of the deflection pattern 26 may be parallel to the tangent direction, whereby the direction of the light emitted from the light emission surface 28 of the optical waveguide 25 can be aligned.

A method of determining the arrangement direction of each deflection pattern 26 on the circumference C having the point light source 24 as its center is described in detail with reference to FIG. 16. When the deflection pattern 26 on the circumference C having a radius r with the point light source 24 centered is assumed, since the ellipse E having the point light source 24 as one focus A is internally in contact with the circumference C, when it is assumed that a longer diameter is a, a shorter diameter is b, a distance between focuses A and B is 2p in the ellipse E, the following relation between the above parameters and the radius r of the circumference C is provided.

$$r = a + p \quad (2)$$

$$p2 = a2 - b2 \quad (3)$$

Here, when it is assumed that a refraction index of the optical waveguide 25 is n, a refraction index in the air is n1, and the outgoing angle of the light from the optical waveguide 25 is γ2 (refer to FIG. 13), ellipticity of the ellipse E is set so as to satisfy the following equation (4). For example, when the outgoing angle γ2=20° and the refraction indexes n1=1 and n=1.53, the ellipticity is 0.97469.

[Equation 2]

$$\frac{b}{a} = \sqrt{1 - \frac{n_1^2 \cdot \sin^2\gamma_2}{n^2}} \quad (4)$$

According to the above equations (2), (3) and (4), since the longer diameter a, the shorter diameter b and the distance 2p between the focuses can be determined using the radius r of the circumference C as a parameter, the ellipse E can be determined.

In addition, FIG. 16 shows an explanatory diagram when viewed from the direction vertical to the optical waveguide 25, in which u-axis direction passes through the point light source 24 and shows the direction parallel to the orthogonal projection to the light emission surface 28 in the direction of the light emitted from the light emission surface 28, and v-axis direction shows the direction vertical to the u-axis direction.

Thus, when the ellipse E is determined with respect to the circumference C in which the deflection patterns 26 are arranged, the longitudinal direction of the deflection pattern 26 is determined so as to be parallel to the tangent of the ellipse E at the intersection point of the line connecting the point light source 24 to the deflection pattern 26 with the ellipse E. Thus, when the direction of the deflection pattern 26 on the circumference C is determined, the normal lines N vertical to the inclination surface of each deflection pattern 26 on the circumference C when viewed from the direction vertical to the optical waveguide 25 are intersect with each other at one point at the following position from the point light source 24.

$L=p(1+p/a)=k\cdot n1\cdot \sin \gamma 2$ ($k$ is any proportionality constant)

In addition, as it can be clear from FIG. 16, when the deflection pattern 26 is arranged on the ellipse E which satisfies the above equation (4) like the deflection pattern 26 shown by a solid line in FIG. 16, the light from the point light source 24 can be obliquely emitted in one direction from the light emission surface 28 of the optical waveguide 25 so that the arrangement of the deflection patterns 26 can be easily designed. However, unlike the case they are arranged on the circumference, when they are arranged on the ellipse, since a distance in the ellipse depends on the position in the optical waveguide 25 (for example, the distance in the v-axis direction is larger than that in the u-axis direction), the pattern density is varied. In order to keep the pattern density constant, a length in the longitudinal direction has to be adjusted depending on its position.

In addition, it is preferable that the side surface of the deflection pattern 26 is parallel to the light from the point light source 24 or inclined so as to be withdrawn inward at the back in order to prevent that the light from the point light source 24 is not reflected by the inclination surface of the deflection pattern 26 but reflected by the side surface thereof and becomes the noise light.

Figure 18:
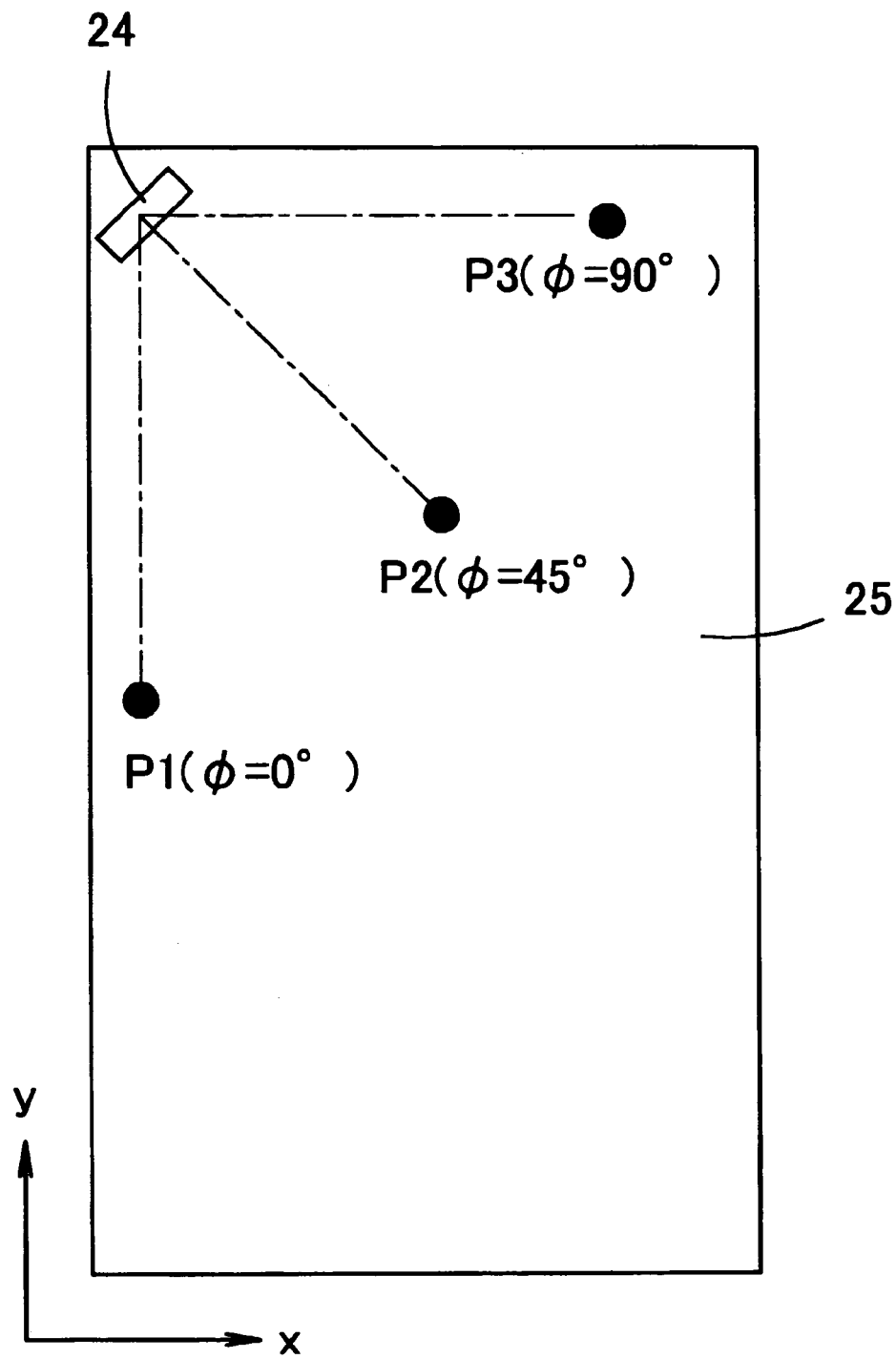
FIG. 18 shows a plan view of the positions in which the above light intensity distribution is simulated.

FIGS. 17A, 17B and 17C each show results in which the brightness distribution of the emitted light at P1, P2 and P3 positioned in the directions F (=0°, 45° and 90°) around the point light source 24 centered as shown in FIG. 18 is simulated, using the front light 22 constituted as described above, and a region having brightness which is not less than a half value of a maximum value of the brightness is plotted in each case. In addition, in FIGS. 17A, 17B or 17C, a lateral axis designates the x-axis direction (the above v direction) in FIG. 18, and a vertical axis designates the y-axis direction (the above u direction) in FIG. 18, showing the direction from the normal line of the light emission surface to the direction inclined by 90°. As can be clear from FIGS. 17A, 17B and 17C, although the region having the half value or more of the brightness is long in the direction connecting the point light source 24 to each position, each region exists on y axis and the emission direction is almost aligned in the specific direction. Since the reflective type of liquid crystal display panel 23 has a diffusion characteristics in the reflection surface 34, as long as the region having the half or more of the brightness distribution of the light emitted from each position of the front light 22 comprises the specific direction, brightness unevenness is not generated in the screen and visibility can be maintained. In addition, since the specific direction is different from the direction vertical to the light emission surface 28, the reflection light by the light emission surface 28 of the front light 22 or the surface of the liquid crystal display panel 23 is not emitted in the direction of the front screen, so that contrast is increased.

Figure 19:
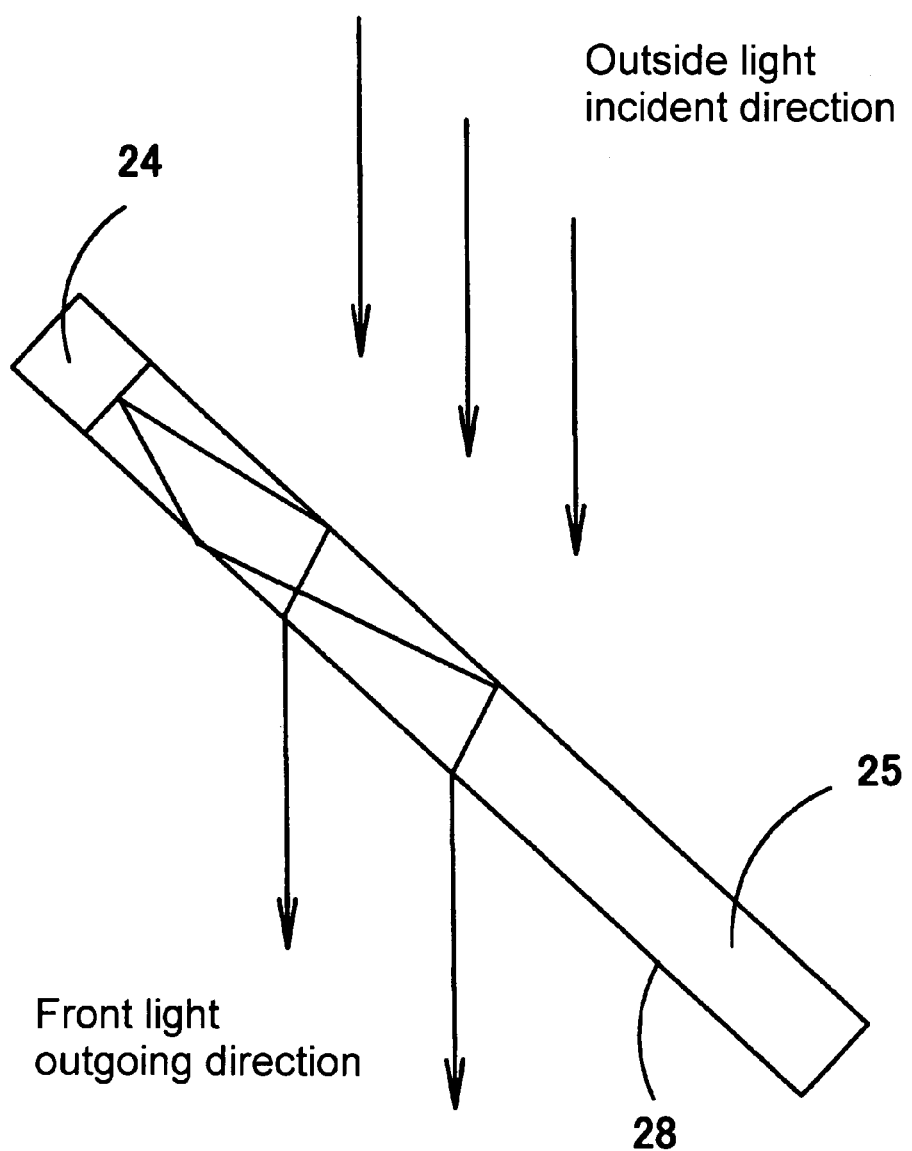
FIG. 19 shows a view of angle (position) of the front light when used.

Next, consideration is given to an actual used case. Since the reflective type of liquid crystal display 21 is used as a display in a mobile phone or the like, it is often used or viewed in a state in which it stands vertically or obliquely. In this reflective type of liquid crystal display 21, it is preferable that the direction of the light emitted from the light emission surface 28 of the front light 22 is inclined vertically. Especially, it is preferable that it is inclined downward. Therefore, the point light source 24 is to be arranged at an upper end (outside of the effective emission region 25a in which image light passes through) of the optical waveguide 25 in the used state. When the point light source 24 is arranged at the upper end of the optical waveguide 25, as shown in FIG. 19, the light from the front light 22 can be easily emitted downward. In other words, an angle formed between the normal line of the inclination surface 29 of the deflection pattern 26 and the beam of light input to the inclination surface 29 is increased, so that the light can be totally reflected by the inclination surface 29 and emitted downward.

Thus, when the light is obliquely emitted from the front light 22 downward, the input direction (and output direction) of the outside light and that of the light emitted from the front light 22 are aligned so that both outside light and light from the front light 22 is reflected by the reflection surface 34 of the liquid crystal display panel 23 to be emitted in the vertical direction (the front surface direction of the reflective type of liquid crystal display 21). As a result, since the same illumination can be implemented when the liquid crystal display panel 23 is illuminated by the front light 22 and when the liquid crystal display panel 23 is illuminated by the outside light, the screen can be clearly viewed. In addition, in order to prevent brightness from becoming uneven by spreading the light all over the effective emission region 25a, it is preferable that the point light source 24 is arranged on the short side of the effective emission region 25a.

Figure 20:
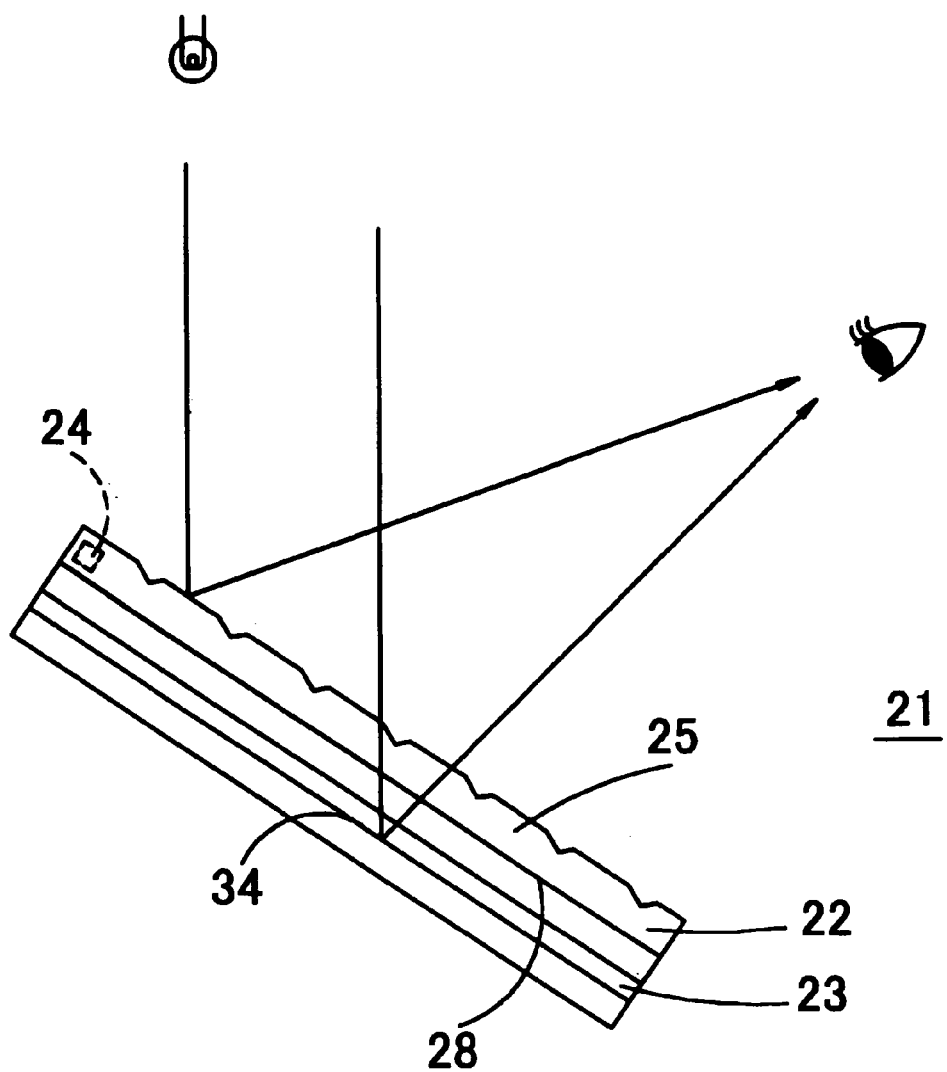
FIG. 20 shows a schematic view of image light and noise light generated by outside light.

Next, consideration is given to an angle of the light emitted from the light emission surface 28 of the optical waveguide 25. Since the outside light such as sunlight or illumination light is usually positioned sufficiently higher than the reflective type of liquid crystal display 21, the angle of the outside light input to the optical waveguide 25 is determined by the angle (used state) of the reflective type of liquid crystal display 21. In a case a user views the front surface of the screen of a small mobile device such as a mobile phone in hand, when the inclination of the liquid crystal screen is less than 15°, the noise light reflected by the surface of the front light 22 or the like is viewed together with the image light as shown in FIG. 20, so that the contrast of the image is lowered and the image is not clear. In other words, when the liquid crystal screen is inclined by 150 or more from the horizontal direction to the outside light input from almost just above, the outside light is not caught by the liquid crystal screen. Therefore, when the angle of the light emitted from the light emission surface 28 of the front light 22 is set at 15° or more like the outside light, the screen can be viewed at an angle in which the outside light is not reflected. Therefore, the outgoing direction of the light emitted from the light emission surface 28 is inclined from the normal line of the light emission surface 28 by 15° or more.

In addition, when the mobile device is in hand, the liquid crystal screen is generally inclined in a range of 20° to 35° from the horizontal direction and the incident angle of the outside light is 20° to 35°. Therefore, the outgoing angle of the light form the light emission surface 28 is inclined in the range of 20° to 35° from the normal line of the light emission surface 28 like the incident angle of the outside light.

Figure 21:
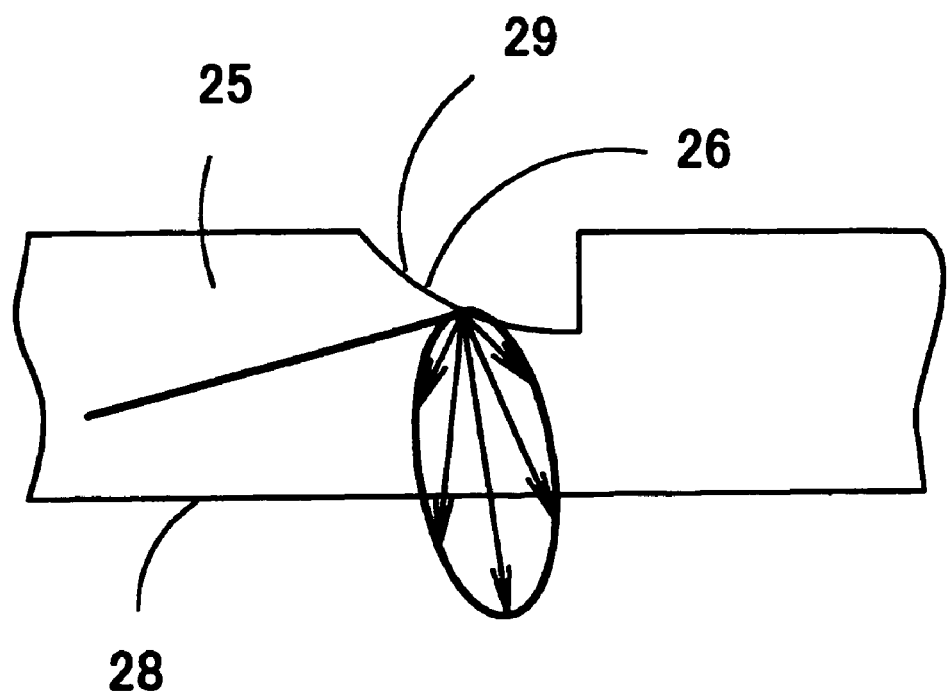
FIG. 21 shows a sectional view of another sectional configuration of the deflection pattern.

In addition, although the sectional configuration of the deflection pattern 26 is the right triangle in the above embodiment, the deflection pattern 26 may have another sectional configuration. In the case of the deflection pattern 26 having the sectional configuration of the right triangle, the light which was not reflected by the inclination surface 29 of the deflection pattern 26 is not emitted in the direction of a viewer as it is and it is likely to be input from the trapping surface 30 to the optical waveguide 25 again (refer to FIG. 9). Meanwhile, as long as the deflection pattern 26 has an inclination surface for reflecting the light, it may have another sectional configuration. In addition, as shown in FIG. 21, the inclination surface 29 may have a curved surface so that the emission light has a diffusive property.

In addition, as shown in FIG. 22A, the point light source 24 may be arranged in the center of the upper end of the optical waveguide 25 (outside of the effective emission region 25a in which the image light passes through). However, when the point light source 24 is arranged in the center, as show in FIG. 22A, if the light emitted from the point light source 24 does not have an orientation angle as large as almost 180°, a dark part could be generated at the corner of the effective emission region 25a (screen). Meanwhile, when the point light source 24 is arranged at the corner of the optical waveguide 25, as shown in FIG. 22B, the orientation angle of the light emitted from the point light source 24 can be reduced to the degree of 90°, and the dark part is not likely to be generated in the effective emission region 25a. In addition, when the point light source 24 is arranged at the corner, the emission direction of the noise light directly emitted from the surface 27 of the optical waveguide 25 toward the viewer is in the oblique direction from the vertical direction of the screen, in the center of the screen, so that the noise light is not likely to be caught by the viewer.

(Embodiment 2)

Figure 23:
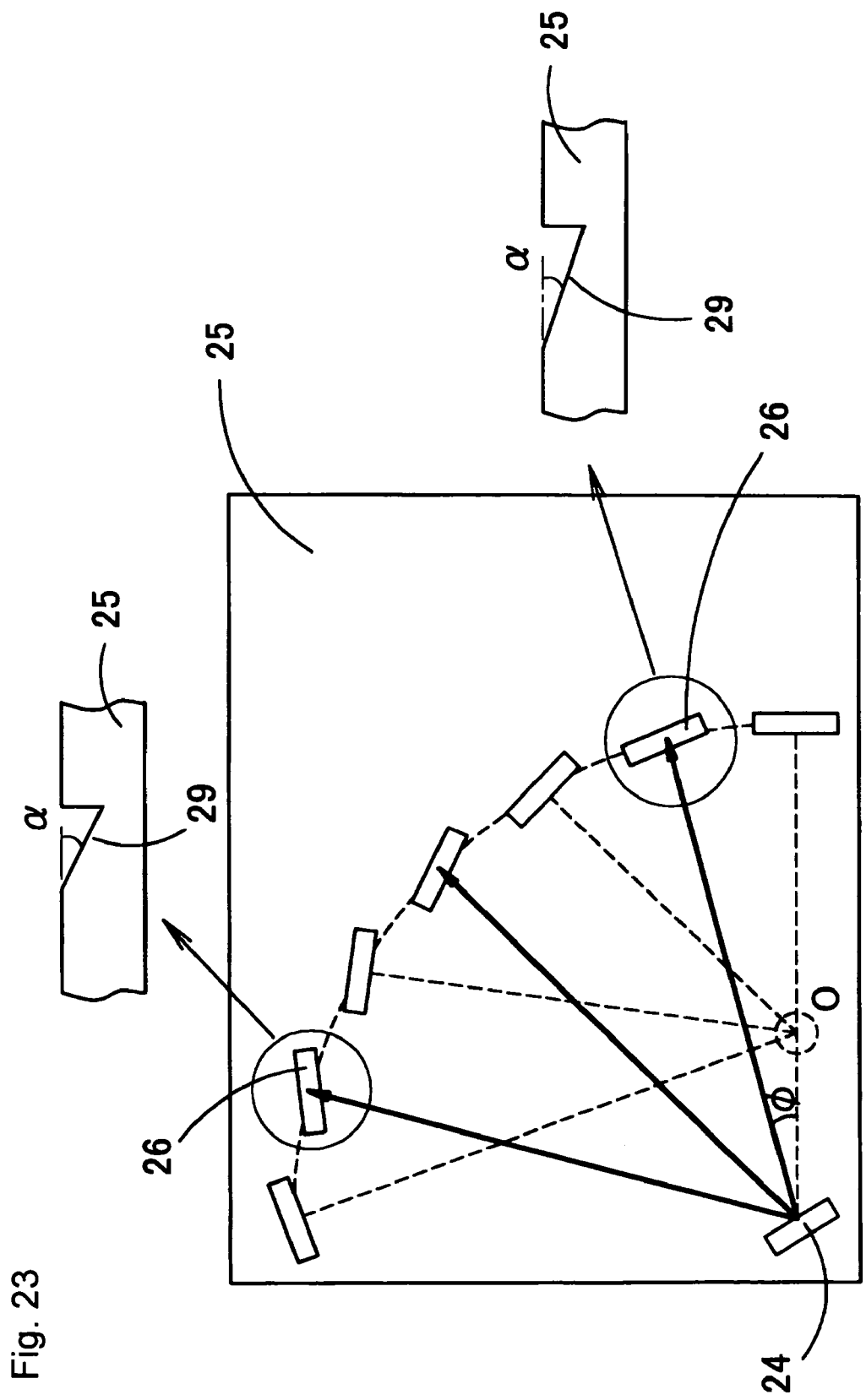
FIG. 23 shows a schematic view for explaining an embodiment 2 of the present invention.

FIG. 23 shows a view for explaining a second embodiment of the present invention. Although the inclination angle a of the inclination surface 29 provided in the deflection pattern 26 is the same angle (50°) in the embodiment 1, in this embodiment 2, the inclination angle a of an inclination surface 29 is varied depending on its position. More specifically, according to deflection patterns 26 exist on the same circumference having a point light source 24 as its center when viewed from the direction vertical to a light emission surface 28, as an angle F formed between the direction connecting an intersection point O of normal lines of the inclination surface 29 to the point light source 24, and the direction connecting the point light source 24 to the deflection pattern 26 is increased, as shown in FIG. 23, the inclination angle a of the deflection pattern 26 (the angle formed between the inclination surface 29 and a surface 27 of the optical waveguide 25) is gradually increased.

More specifically, the inclination angle a is set in such a manner that the normal lines of the inclination surface 29 of the deflection patterns 26 existing on the same circumference having the point light source 24 as its center may intersect with each other at almost the same position O in the air (refer to FIG. 14) and it is determined as follows. When it is assumed that the angle formed between the direction connecting the intersecting point O of the normal lines of the inclination surface 29 to the point light source 24, and the direction connecting the point light source 24 to the deflection pattern 26 is F, and the incident angle of light totally reflected by the inclination surface 29 and into the light emission surface 28 is γ1 (for example 12.9° as described above) (refer to FIG. 13) when viewed from the direction vertical to the light emission surface 28 of the optical waveguide 25, the inclination angle a of the inclination surface 29 is determined so as to satisfy the following equation (5). It is needless to say that the arrangement of the deflection patterns 26 satisfies the above equation (1) also.

[Equation 3]

$$\alpha = \arccos\left(\frac{\cos\gamma_1}{\sqrt{2 - 2\cdot\sin\gamma_1 \cdot \cos\phi}}\right) \quad (5)$$

FIGS. 24A, 24B and 24C each show results in which the brightness distribution of the emitted light at P1, P2 and P3 positioned in the directions F (=0°, 45° and 90°) with the point light source 24 centered is simulated as shown in FIG. 18, using the front light 22 in which the inclination angle a is varied, and a region having the maximum brightness is plotted in each case. In addition, in FIG. 24A, 24B or 24C, a lateral axis designates the x-axis direction in FIG. 18, and a vertical axis designates the y-axis direction in FIG. 18, showing the direction from the normal line of the light emission surface to the direction inclined by 90°. According to the embodiment 2, the direction in which the brightness of the light from the light emission surface 28 becomes the maximum is inclined by 19° to 26° from the normal direction of the light emission surface 28 and has a half width within ±16° from the vertical direction (y-axis direction) when viewed from the direction vertical to the light emission surface 28.

(Embodiment 3)

Figure 25:
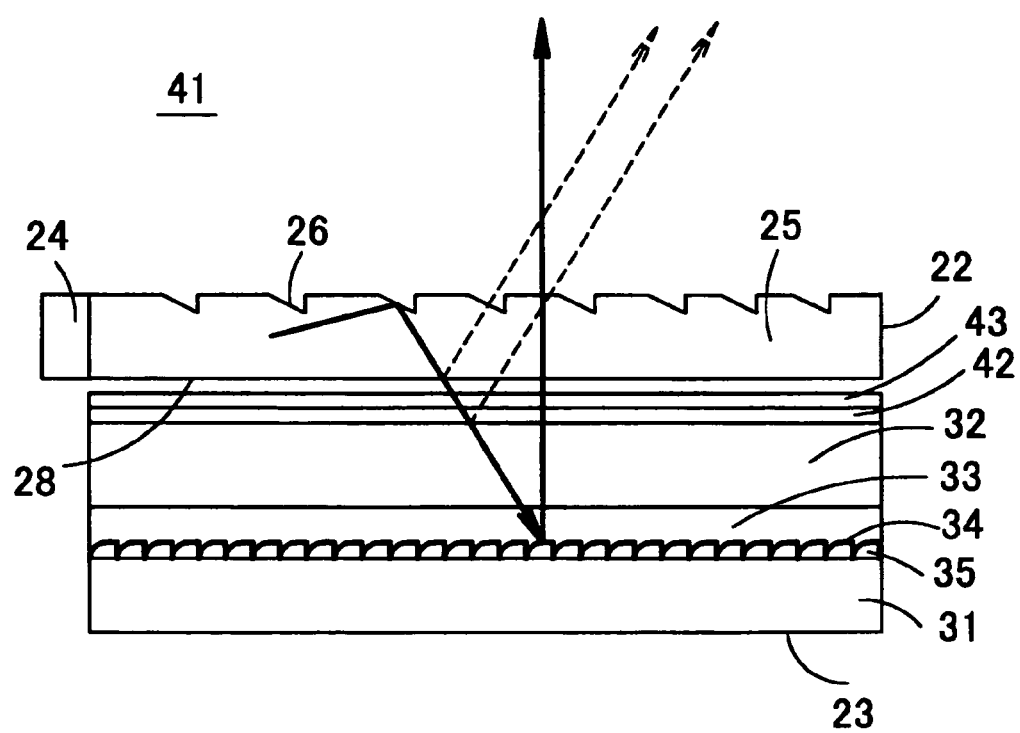
FIG. 25 shows a schematic sectional view of a reflective type of liquid crystal display according to an embodiment 3 of the present invention.

FIG. 25 shows a schematic sectional view of another reflective type of liquid crystal display 41 using a front light 22 according to the present invention. The front light 22 is almost the same as described in the embodiment 1 except that a point light source 24 is arranged outside of the optical waveguide 25.

According to a liquid crystal display panel 23, a liquid crystal material 33 is sealed between a glass substrate 32 and a back surface substrate 31, and a ¼ wavelength plate 42 and a deflection plate 43 are provided on the glass substrate 32. However, the ¼ wavelength plate 42 is not always needed and it may not be used. A TFT electrode for turning on/off the pixel is provided in one of the back surface substrate 31 and the glass substrate 32 and a transparent electrode is provided in the other. In addition, in the case of a color reflective type of liquid crystal display 41, a color filter is provided over or under the liquid crystal material 33.

Figure 26:
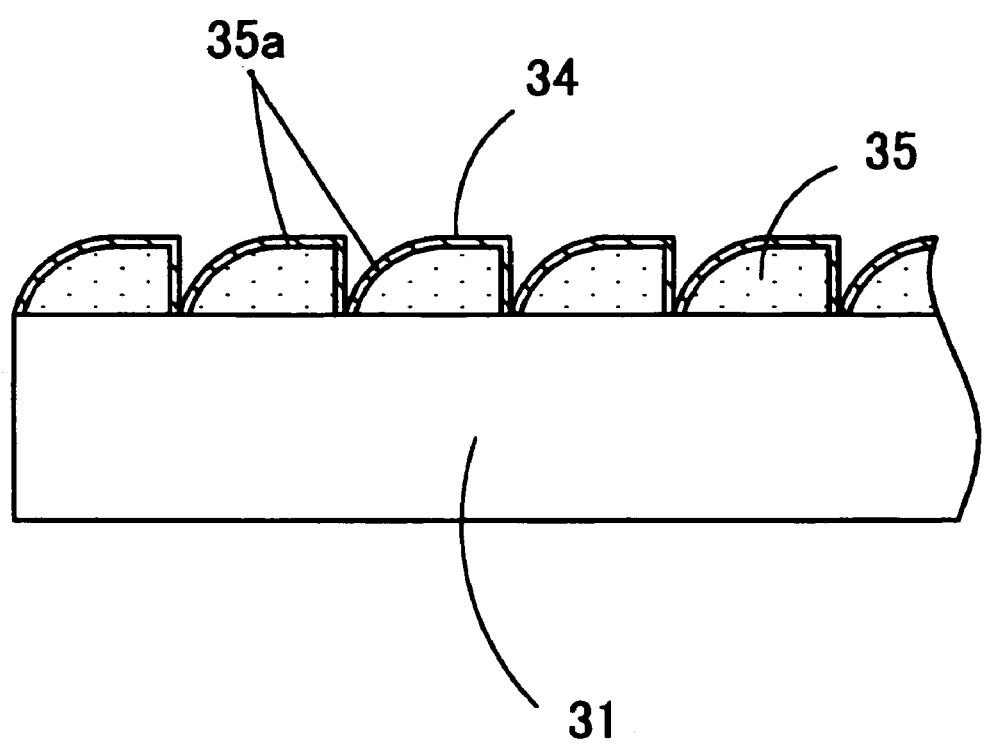
FIG. 26 shows a partially broken enlarged sectional view of a configuration of a reflection surface in the above reflective type of liquid crystal display.

In addition, on the back surface substrate 31, as shown in FIG. 26, an inclination pattern 35a which is convexed in surface by an insulating material layer 35 is arranged every constant pitch and a reflection surface 34 is formed by depositing a metal material such as aluminum onto the insulating material layer 35.

Thus, as shown in FIG. 25, according to the reflective type of liquid crystal display 41, the light propagated in the optical waveguide 25 is totally reflected by a deflection pattern 26 to be emitted in the direction inclined from the light emission surface 28 of the optical waveguide 25 by 22°, and the light emitted from the light emission surface 28 is vertically reflected upward by the inclined pattern of the reflection surface 34 and emitted to the front surface of the reflective type of liquid crystal display 41. At this time, since the pattern of the reflection surface 34 is curved, the light reflected by the reflection surface 34 is slightly scattered so that the outside light or scenery is prevented from being caught by the reflection surface.

In addition, since the noise light regularly reflected by the light emission surface 28 of the optical waveguide 25 or the glass substrate 32 is emitted in the oblique direction as shown by broken lines in FIG. 25, it does not overlap with the image light emitted to the front surface so that the contrast of the image can be improved.

FIG. 27A and FIG. 27B show results in which brightness distribution of the light emitted from the front surface of the reflective type of liquid crystal display 41 is measured with the above reflective type of liquid crystal display 41. The lateral axis in FIG. 27 shows inclination from the normal direction of the screen of the reflective type of liquid crystal display 41, which is set at 0°. From the measured results also it can be seen that the light reflected by the reflection surface 34 is reflected to the vertical direction (front surface).

In addition, although the reflection surface 34 comprising inclined patterns is used in this embodiment, it is not always necessary to reflect the light input in the oblique direction in the vertical direction by the reflection surface, and the reflection surface may have a general diffusive property. In this case, it is preferable that the emission angle of the light emitted from the light emission surface 28 of the front light 22 is emitted in the oblique direction smaller than the diffusion angle of the refection surface 34.

In addition, although the light emitted from the light emission surface 28 of the front light 22 passes through the liquid crystal material 33 and then it is reflected by the reflection surface 34, since the reflection surface 34 has a diffusive property, even when the light from the front light 22 is slightly deviated from the ideal direction or varied, it does not affects on the visibility of the screen. For example, when a directional characteristic of the light from the front light 22 is relatively low, the direction in which the intensity of the light from the front light 22 at each emission position is half or more has to comprise the specific direction, and when the specific direction is not in the vertical direction to the light emission surface 28, the noise light emitted in the direction of the front surface of the screen can be reduced. In addition, since the diffusive property of the reflection surface 34 diffuses the input parallel light in the direction of ±30°, when the directional characteristic of the light from the front light 22 is high, the direction in which the intensity of the light from the front light 22 at each position becomes the maximum may be in a range of 30° with the specific direction centered.

Although description was made of the case in which the elongated normal lines of the inclination surfaces 29 of the deflection patterns 26 on the same circumference intersect with each other at almost the same position O so far, consideration is given to an allowable range of the normal line of the inclination surface 29 of the deflection pattern 26. Although it is ideal that the normal lines of the inclination surface 29 intersect with each other at the same point O, there is no problem when the normal line is deviated from the intersection O in a predetermined range.

That is, when the reflection surface 34 of the reflective type of liquid crystal display diffuses the light in the direction of ±30°, the direction in which the intensity of the light from the front light 22 becomes the maximum may have variation in the range of 30° with the specific direction centered. At this time, when it is assumed that the refraction index of the material forming the optical waveguide 25 is 1.5 and the emission direction is 20°, the light reflected by the inclination surface 29 of the deflection pattern 26 may be deviated from the ideal direction within a range of 20° in the optical waveguide 25 according to Snell's law. Thus, it can be understood that the normal direction of the inclination surface 29 may be deviated from the ideal direction within a range of 10° (because the reflection direction of the light is deviated by 2° when the angle of the inclination surface 29 is deviated by 1°).

Figure 28A:
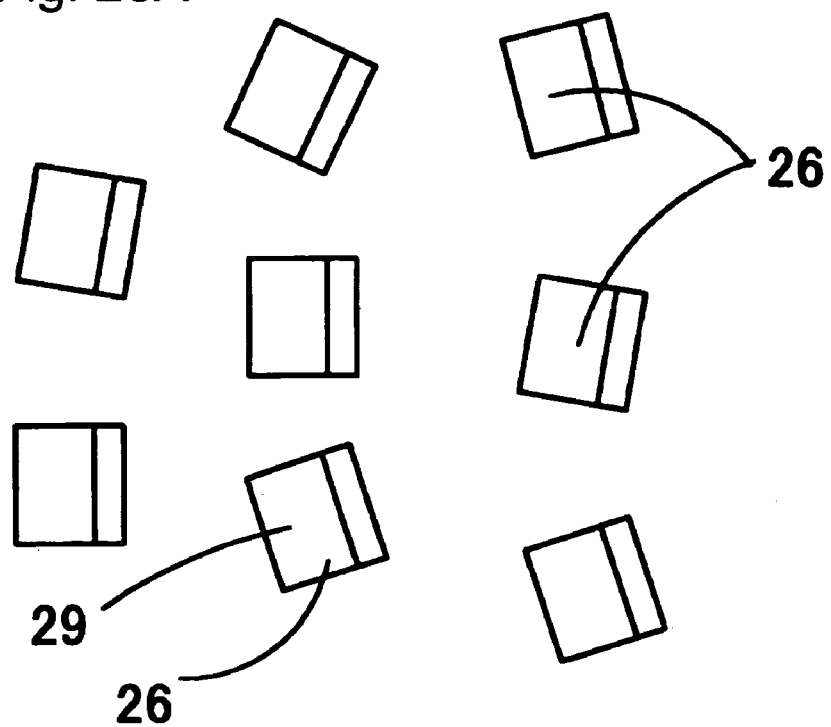
FIG. 28A and FIG. 28B show views of deflection patterns for scattering the reflection light which are seen from inside of a optical waveguide (lower surface side).
Figure 28B:
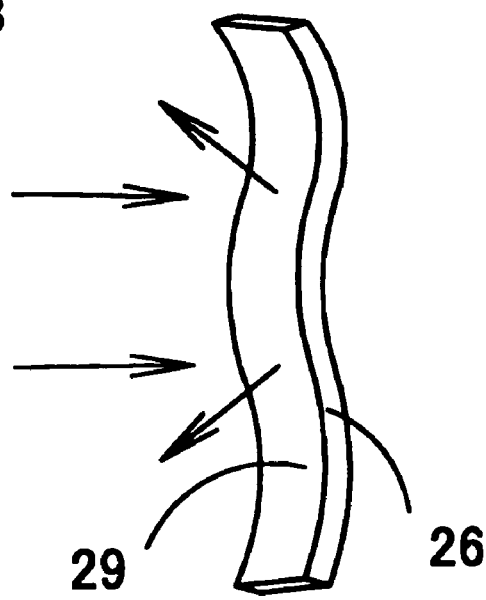

In addition, the normal direction of the inclination surface 29 may have variation and the light emitted from the front light 22 may have the diffusive property. In this case, in the surface of the optical waveguide 25 on the same circumference having the point light source 24 as its center, as long as the average direction of the normal directions of the inclination surfaces 29 in a certain region intersects with the average direction of the normal directions of the inclination surfaces 29 in another region at almost the same point, the directions of the deflection patterns 26 may have variation and the direction of the normal line of the inclination surface 29 in the certain region may be varied from the average direction of the normal directions as shown in FIG. 28A. Furthermore, as shown in FIG. 28B, the diffusive property may be provided by curving the inclination surface 29 of the deflection pattern 26 into a meandering shape. When the normal direction of the inclination surface 29 has the variation, it is preferable that the range is 300 or less around the average direction of the normal lines of the inclination surface 29 in the predetermined region.

(Referring to Point Light Source)

Although the term of "point light source" has been used, the point light source according to the present invention (especially, as a term in claims) is used in concept larger than the literal point light source. That is, it is preferable that the directions of the emission light at positions of the light emission surface are aligned with each other when viewed from the direction vertical to the light emission surface of the optical waveguide 25. When the light emitting region of the light source is a point, the proceeding direction of the light can be aligned, but actually the light emitting region is limited in size. In the region of 50% or more in the effective emission region of the optical waveguide, when the angle formed by lines connecting any point in the region to both ends of the light emitting region of the light source is not more than 10°, the light can be precisely controlled and the light source having such dimension can be used as the point light source. In addition, in the region of 50% or more in the effective emission region of the optical waveguide, when the angle formed by lines connecting any point in the region to both ends of the light emitting region of the light source is not more than 25°, the light can be substantially controlled and can be emitted with no problem.

Therefore, the point light source according to the present invention includes the point light source which satisfies the above condition besides the general point light source. That is, regarding a relation with the optical waveguide, in the region of 50% or more in the effective emission region of the optical waveguide, when the angle formed by lines connecting any point in the region to both ends of the light emitting region of the light source is not more than 25°, this light source is considered to be the point light source according to the present invention.

In addition, the light emitting point of the point light source is not necessarily one and it may have a plurality of emitting points as long as they are closely arranged and localized.

In addition, the liquid crystal display panel is used in the above description of the embodiments as an example of a reflective type of display panel, the present invention is not limited to the case the liquid crystal is used.

(Application)

Figure 29:
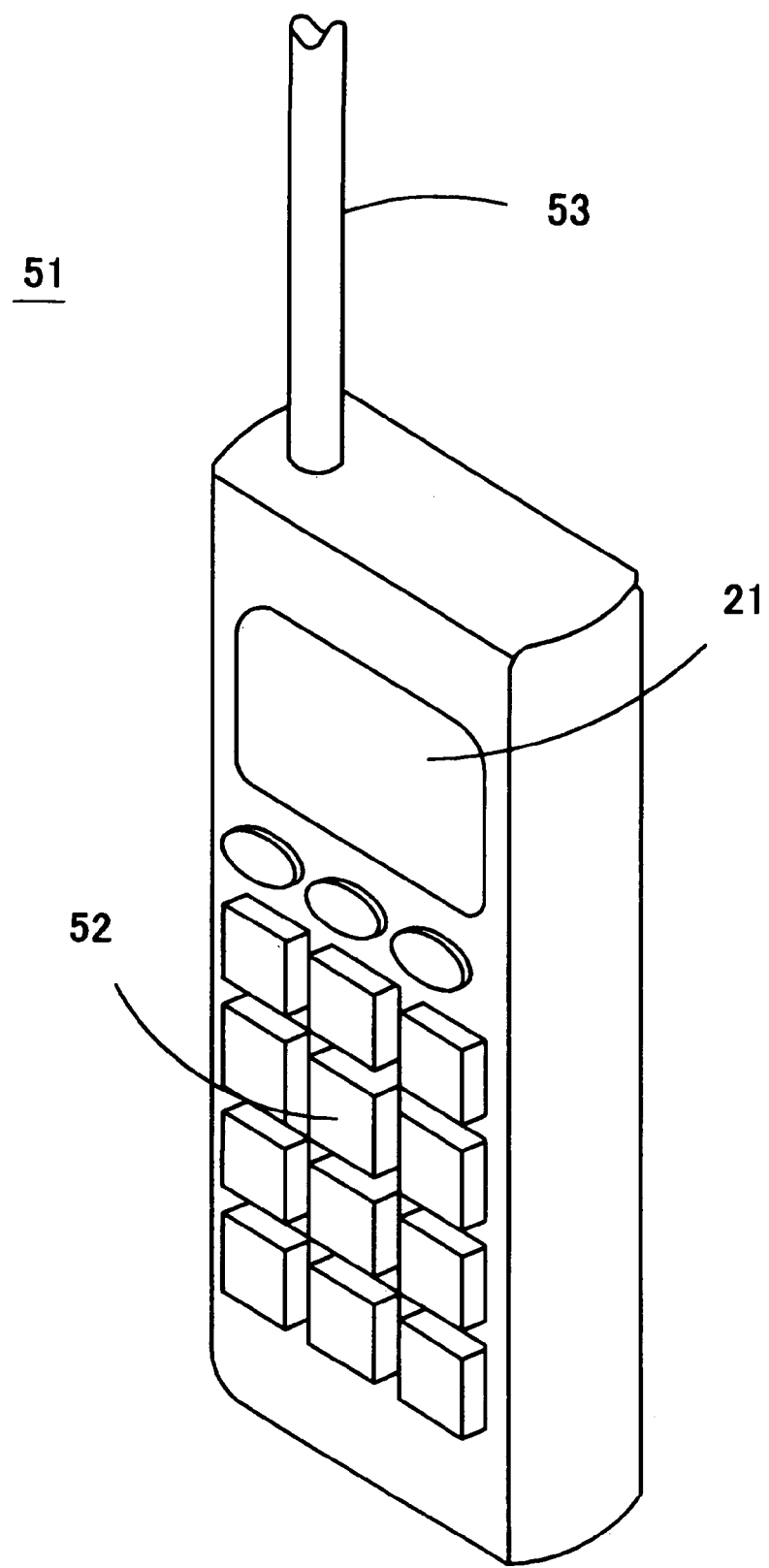
FIG. 29 shows a perspective view of a mobile phone in which the reflective type of liquid crystal display according to the present invention is incorporated.

FIG. 29 shows a mobile phone 51 incorporating the reflective type of liquid crystal display 21 of the present invention (or the reflective type of liquid crystal display 41). According to this mobile phone 51, the reflective type of liquid crystal display 21 is incorporated above a dial part 52 comprising a numeric keypad and the like and an antenna 53 is provided on an upper surface.

Figure 30:
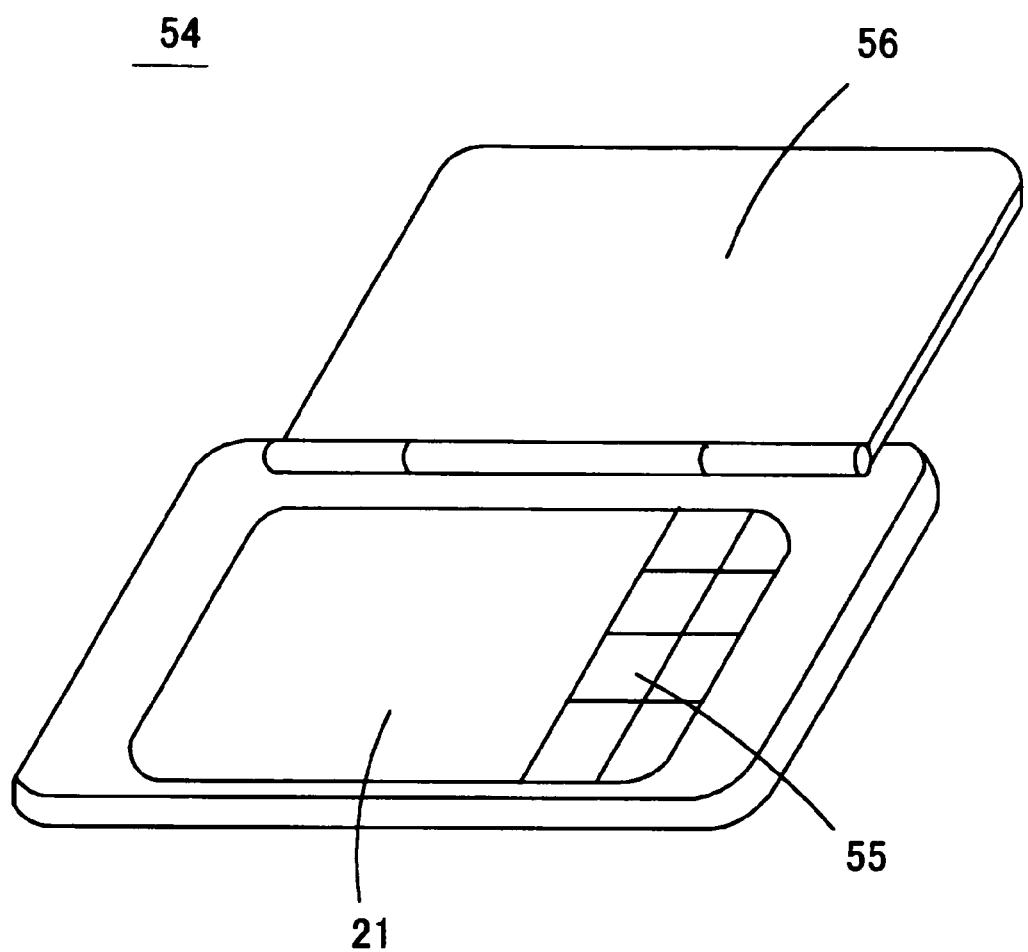
FIG. 30 shows a perspective view of a mobile information terminal in which the reflective type of liquid crystal display according to the present invention is incorporated.

FIG. 30 shows a mobile information terminal 54 such as a PDA in which the reflective type of liquid crystal display 21 of the present invention (or the reflective type of liquid crystal display 41) is incorporated. According to this mobile information terminal 54, an input part 55 such as a pen input is provided beside the reflective type of liquid crystal display 21 and a lid 56 is provided at an upper end.

When the reflective type of liquid crystal display 21 is used in the mobile phone 51, the mobile information terminal 54 and the like, there can be provided a display part in which contrast and visibility is excellent.

The front light according to the present invention can be used as a front light of a reflective type of display, especially reflective type of liquid crystal display as can be clear from the above application. Furthermore, it can be used in the display part of various kinds of devices other than the mobile information terminal and the mobile phone.

What is claimed is:

1. A front light comprising:
   an optical waveguide having a first surface and a second surface facing the first surface; and
   a point light source arranged to emit light into the optical waveguide,
   wherein a plurality of patterns comprising inclination surfaces for deflecting the light are provided on the first surface,
   wherein an angle formed by a direction connecting the point light source to an inclination surface of one of the patterns and a normal line of the inclination surface of the one of the patterns is selected depending on the direction connecting the point light source to the inclination surface of the one of the patterns, and
   wherein normal lines of the inclination surfaces of the patterns on a circumference centering around the point light source are converged on one point existing at a position different from that of the point light source when viewed from a direction vertical to the second surface of the optical waveguide.

2. The front light according to claim 1, wherein a longitudinal direction of at least one of the patterns on the circumference centering around the point light source is substantially parallel to a tangential direction of an ellipse, a focal point of which coincides with the point light source, at an intersection of a line, which connects the point light source to the at least one of the patterns, with the ellipse.

3. The front light according to claim 1, wherein the patterns on the circumference centering around the point light source are configured such that an angle formed by each of the inclination surfaces of the patterns and the first surface increases in accordance with an increase in an angle formed by the direction connecting the point, where the normal lines of the inclination surfaces are converged, to the point light source and the direction connecting the point light source to each of the inclination surfaces.

4. The front light according to claim 1, wherein the first surface is positioned at an upper portion of the optical waveguide in a vertical direction of an object illuminated with the light passed through the second surface.

5. The front light according to claim 1, wherein the point light source is arranged in the vicinity of a corner of an effective emission region of the optical waveguide.

6. A reflective type display comprising a front light according to claim 1, and a reflective type display panel arranged on the second surface side of the front light and having a reflection surface for reflecting the light emitted from the second surface.

7. A reflective type display comprising a front light according to claim 1, and a reflective type display panel arranged on the second surface side of the front light and having a reflection surface for reflecting the light emitted from the second surface, wherein the reflection surface reflects the light input from a direction oblique to a normal line of the second surface in a direction vertical to the second surface.

8. A front light comprising:
   an optical waveguide having a first surface and a second surface facing the first surface; and
   a point light source arranged to emit light into the optical waveguide,
   wherein a plurality of patterns comprising inclination surfaces for deflecting the light are provided on the first surface,
   wherein an angle fonned by a direction connecting the point light source to an inclination surface of one of the patterns and a normal line of the inclination surface of the one of the patterns is selected depending on the direction connecting the point light source to the inclination surface of the one of the patterns, and
   wherein at least one of the patterns is arranged on a circumference of an ellipse, a focal point which coincides with the point light source, in such a manner that a longitudinal direction of the at least one of the patterns is substantially parallel to a tangential direction of the ellipse when viewed from a direction vertical to the second surface of the optical waveguide.

9. The front light according to claim 8, wherein the first surface is positioned at an upper portion of the optical waveguide in a vertical direction of an object illuminated with the light passed through the second surface.

10. The front light according to claim 8, wherein the point light source is arranged in vicinity of a corner of an effective emission region of the optical waveguide.

11. A reflective type display comprising a front light according to claim 8, and a reflective type display panel disposed on the second surface side of the front light and having a reflection surface for reflecting the light emitted from the second surface.

12. A reflective type display comprising a front light according to claim 8, and a reflective type display panel arranged on a second surface side of the front light and having a reflection surface for reflecting light emitted from the second surface, wherein the reflection surface reflects the light input from a direction oblique to a normal line of the second surface in a direction vertical to the second surface.

13. A front light comprising:
   an optical waveguide having a first surface and a second surface facing the first surface; and
   a point light source arranged to emit light into the optical waveguide,
   wherein a plurality of patterns comprising inclination surfaces for deflecting the light are provided on the first surface, wherein an angle formed by a direction connecting the point light source to an inclination surface of one of the patterns and a normal line of the inclination surface of the one of the patterns is selected depending on the direction connecting the point light source to the inclination surface of the one of the patterns, and wherein normal lines of the inclination surfaces of the patterns on a circumference centering around the point light source are converged on one point that does not coincide with the point light source, and wherein an angle formed by each of the normal lines and the first surface varies depending on a position of each of the patterns.

14. The front light according to claim 13, wherein the first surface is positioned at an upper portion of the optical waveguide in a vertical direction of an object illuminated with the light passed through the second surface.

15. The front light according to claim 13, wherein the point light source is arranged in vicinity of a corner of an effective emission region of the optical waveguide.

16. A reflective type display comprising a front light according to claim 13, and a reflective type display panel disposed on the second surface side of the front light and having a reflection surface for reflecting the light emitted from the second surface.

17. A reflective type display comprising a front light according to claim 13, and a reflective type display panel arranged on a second surface side of the front light and having a reflection surface for reflecting light emitted from the second surface, wherein the reflection surface reflects the light input from a direction oblique to a normal line of the second surface in a direction vertical to the second surface.

* * * * *